United States Patent [19]

Harada et al.

[11] Patent Number: 4,722,249
[45] Date of Patent: Feb. 2, 1988

[54] CONTROL SYSTEM FOR A TRANSMISSION HAVING A MAIN TRANSMISSION AND A SUB-TRANSMISSION

[75] Inventors: Yoshiharu Harada, Toyota; Yutaka Taga, Aichi; Kenichi Yoshizawa, Toyota; Yoichi Hayakawa, Toyoake; Masao Kawai, Chiryu, all of Japan

[73] Assignees: Toyota Jidosha Kabushiki Kaisha; Aisin-Warner Kabushiki Kaisha, both of Aichi, Japan

[21] Appl. No.: 820,657

[22] Filed: Jan. 21, 1986

[30] Foreign Application Priority Data

Jan. 19, 1985 [JP] Japan .................. 60-007767

[51] Int. Cl.⁴ .............................................. B60K 41/10
[52] U.S. Cl. .................................... 74/866; 74/665.7; 74/740; 180/247
[58] Field of Search ............... 180/247, 248, 249, 250; 74/740, 745, 878, 866, 665.7

[56] References Cited

U.S. PATENT DOCUMENTS

| | | | |
|---|---|---|---|
| 3,939,722 | 2/1976 | Stromberg | 74/745 X |
| 4,102,222 | 7/1978 | Miller et al. | 74/866 |
| 4,274,306 | 6/1981 | Yokoi et al. | 74/866 |
| 4,503,927 | 3/1985 | Hayakawa et al. | 180/247 |
| 4,628,770 | 12/1986 | Kodama et al. | 74/866 X |
| 4,630,704 | 12/1986 | Yamakawa et al. | 180/247 |

FOREIGN PATENT DOCUMENTS

| | | | |
|---|---|---|---|
| 0028579 | 5/1981 | European Pat. Off. | 74/745 |
| 148619 | 11/1980 | Japan | 74/740 |

Primary Examiner—Leslie Braun
Assistant Examiner—Dwight G. Diehl
Attorney, Agent, or Firm—Wegner & Bretschneider

[57] ABSTRACT

A transmission control device for controlling the operation of a transmission system which has an automatic main transmission and a manually operable sub transmission. The shifting characteristics of the sub transmission are controlled in accordance with the level of the torque inputted to the sub transmission, so that the transmission as a whole exhibits a superior speed changing performance.

12 Claims, 23 Drawing Figures

CONTROL SYSTEM FOR A TRANSMISSION HAVING A MAIN TRANSMISSION AND A SUB-TRANSMISSION

BACKGROUND OF THE INVENTION

The present invention relates to a transmission control device for controlling the operation of a transmission system having a main transmission and a sub transmission.

A transmission system for vehicles is known which has an automatic or manual main transmission capable of transmitting the power of the engine while changing the speed and a sub transmission which is connected to the output side of the main transmission and capable of transmitting the power to the vehicle wheels in different speed modes. The different speed modes of the sub transmission is attained, for example, by a planetary gear type mechanism which has a sun gear, planetary pinions, a planetary pinion carrier and a ring gear, the sun gear and the carrier being connected to the input shaft and the output shaft of the sub transmission, respectively. In operation, the sun gear and the carrier are brought into and out of engagement with each other through a clutch, while the ring gear is adapted to be releasably fixed by a clutch, so that a direct-coupling drive mode which provides a high output speed is obtained through engaging the clutch and releasing the brake, while a reduced-speed drive mode is obtained through disengaging the clutch and putting the brake into effect. The selective operation of the clutch and brake is conducted hydraulically by means of respective servomotors which in turn operate by low-high change-over valves operative in accordance with the position of a manual shift valve and oil pressure corresponding to the vehicle speed. Each of the change-over valve has a spool which receives at its one end a governor oil pressure correspnding to the speed of the output shaft of the main transmission so that, when the driver has operated the sub transmission for down-shift from the direct-coupling drive mode to the reduced-speed drive mode, the spool operates in response to the pressure corresponding to the speed of the output shaft of the main transmission so as to prevent the change-over of the sub transmission to the reduced-speed mode, thereby avoiding troubles such as over-revolution of the engine which otherwise may be caused by inadequate down-shift operation.

Thus, the known transmission system of the type described has encountered a problem in that, since the spool of the low-high change-over valve is operated by the governor pressure corresponding to the speed of the output shaft of the main transmission, the speed changing characteristics of the transmission system could not be optimized for the actual state of running of the vehicle.

SUMMARY OF THE INVENTION

Accordingly, an object of the invention is to provide a transmission control device for controlling the operation of a transmission system having a main transmission and a sub transmission, capable of providing a superior speed changing characteristics.

Another object of the invention is to provide a transmission control device which can provide speed changing charactristics optimized for the state of running of the vehicle.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

To these ends, according to the invention, there is provided a transmission control device for controlling the operation of a transmission system which includes a main transmission and a sub transmission, comprising: a control means adapted for effecting a change-over of the sub transmission between different speed modes in accordance with the level of the torque inputted to the sub transmission.

With this arrangement, it is possible to obtain superior speed changing characteristics optimum for the state of running of the vehicle.

BRIEF DESCRIPTION OF THE DRAWINGS

For a fuller understanding of the invention, reference is made to the following description taken in connection with the accompanying drawings, in which.

DESCRIPTION OF THE PREFERRED EMBODIMENTS

Preferred embodiments of the transmission control device of the invention will be described hereinafter with reference to the accompanying drawings.

Figure 1:
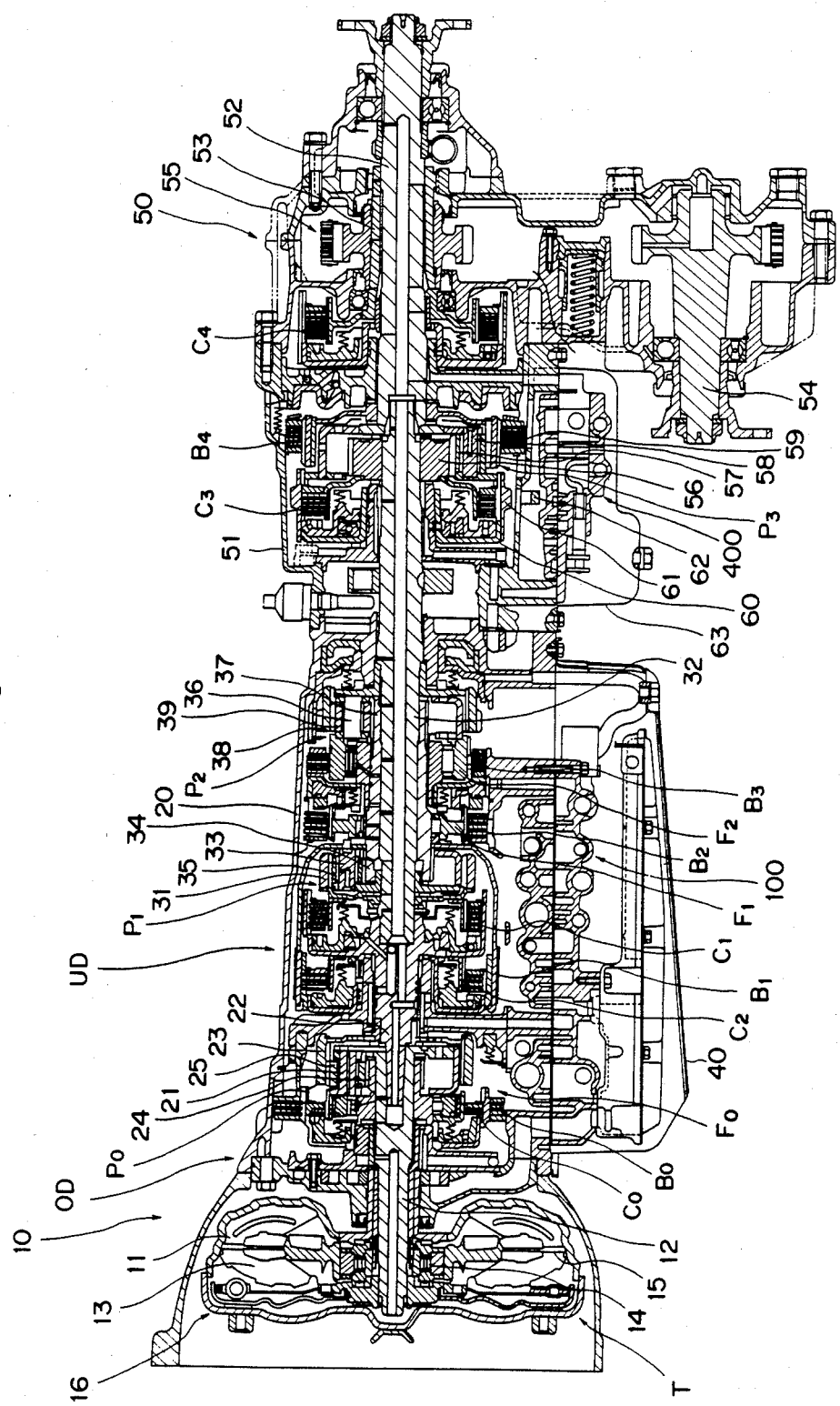
FIG. 1 is a sectional view of a transmission system for four-wheel drive vehicle.
Figure 2:
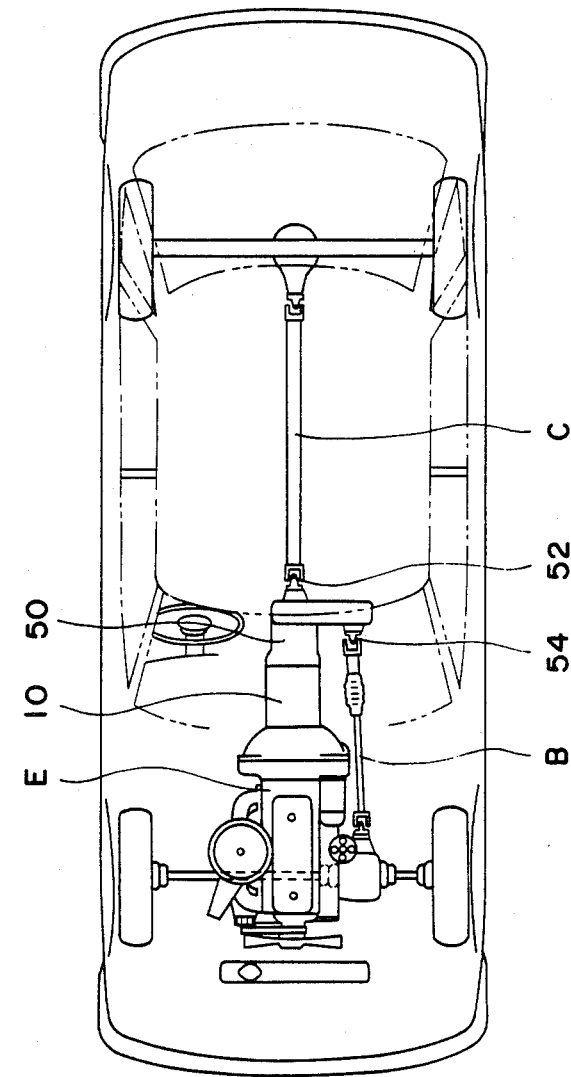
FIG. 2 is a schematic illustration of a driving mechanism for a four-wheel drive vehicle.

FIG. 1 is a sectional view of a transmission system to which the present invention is applied, the transmission system being composed mainly of a four-speed automatic transmission having four forward speed gears and one reverse gear, and a four-wheel drive sub transmission. FIG. 2 schematically shows a four-wheel drive vehicle in which is mounted the transmission system shown in FIG. 1.

Referring first to FIG. 1, the transmission system includes a main transmission 10 which is a four-speed automatic transmission with an overdrive, and a four-wheel drive sub transmission 50 which is coupled to the output side of a planetary gear system incorporated in the main transmission 10. The main transmission 10 is directly mounted on an engine E and has an output shaft 32 which constitutes an input shaft of the four-wheel drive sub transmission 50. The sub transmission 50 has two output shafts: namely, a first output shaft 52 coupled to a rear-wheel drive propeller shaft C and a second output shaft 54 coupled to a front-wheel drive propeller shaft B.

The main transmission 10 is constituted by a fluid type torque converter T, an overdrive mechanism OD and an underdrive mechanism UD having three forward speed gears and one reverse gear.

The torque converter T has a pump impeller 11 coupled to the output shaft of the engine E, a turbine impeller 13 coupled to the output shaft 12 of the torque converter T, a stator 15 connected to a stationary part through a one-way clutch 14, and a direct clutch 16. The output shaft 12 of the torque converter T serves as the input shaft of the overdrive mechanism OD.

The overdrive mechanism OD includes frictional engagement means such as a multi-disc clutch CO, multi-disk brake B0 and a one-way clutch F0, and a planetary gear device P0. The planetary gear device P0 has various constituent parts which are brought into and out of engagement with other parts such as a stationary part, e.g., a main transmission case 20, input shaft, output shaft and other parts, in accordance with the respective states of selective engagement of the above-mentioned frictional engagement means.

More specifically, the planetary gear device P0 has a carrier 21 connected to the output shaft 12, a ring gear 23 connected to the output shaft 22 of the overdrive mechanism OD, a sun gear 24 rotatably carried by the output shaft 12 and fixed to the main transmission case 20 through the brake B0, the sun gear 24 being connected to the carrier 21 through the clutch C0 and also through the one-way clutch F0 parallel to the clutch C0 and planetary pinions 25 rotatably carried by the carrier 21 and held in meshing engagement with the sun gear 24 and the ring gear 23.

The output shaft 22 of the overdrive mechanism OD serves as the input shaft of the underdrive mechanism UD which has three forward speed gears and one reverse gear.

The underdrive mechanism UD has frictional engagement means such as multi-disc clutches C1 and C2, a belt brake B1, multi-disc brakes B2 and B3, one-way clutches F1 and F2, a primary planetary gear device P1 and a secondary planetary gear device P2.

The primary planetary gear device P1 includes a ring gear 31 connected to the output shaft 22 through the clutch C1, a carrier 33 connected to the output shaft 32 of the underdrive mechanism UD, a sun gear 34 connected to the output shaft 22 through the clutch C2 and fixed to the main transmission case 20 through the belt brake B1 and also through a series connection of the one-way clutch F1 and the brake B2 which is parallel to the brake B1 and planetary pinions 35 rotatably carried by the carrier 33 and held in meshing engagement with the sun gear 34 and the ring gear 31.

The secondary planetary gear device P2 includes a carrier 36 which is fixed to the main transmission case 20 through the brake B3 and also through the one-way clutch F2 parallel to the brake B3, a sun gear 37 formed integrally with the sun gear 34 of the primary planetary gear device P1, a ring gear 38 connected to the output shaft 32, and planetary pinions 39 rotatably carried by the carrier 36 and held in meshing engagement with the sun gear 37 and the ring gear 38.

A main hydraulic controller 100 is accommodated by an oil pan 40 connected to the underside of the main transmission case 20 and is provided at the underside thereof with an oil strainer 101. The main hydraulic controller 100 operates in accordance with various factors representing the state of running of the vehicle, e.g., throttle opening of the engine E, vehicle running speed and so forth, so as to selectively engage and disengage the clutches and brakes, thereby effecting gear change over four forward speed gears including the overdrive O/D and the reverse gear which is selected manually.

The sub transmission 50 has a sub transmission case 51 which is coupled to the rear end of the main transmission case 20 by means of a plurality of bolts, such that the output shaft 32 of the main transmission 10 constitutes the input shaft of the sub transmission 50. More specifically, the sub transmission 50 has frictional engagement means such as a clutch C3, a brake B4 and a clutch C4 which are driven by the input shaft constituted by the common output shaft of the planetary gear devices P1 and P2. The sub transmission 50 has a first output shaft 52 connected in series to the output shaft 32, a planetary gear device P3 interposed between the output shaft 32 and the first output shaft 52, a four-wheel drive sleeve 53 rotatably fitted around the first output shaft 52, a second output shaft 54 disposed in parallel with the output shaft 32 and projecting in the direction opposite to the first output shaft 52, and a transfer mechanism 55 through which the sleeve 53 is connected to the second output shaft 54. The planetary gear device P3 includes a sun gear 56 splined to the end of the output shaft 32, planetary pinions 57 meshing with the sun gear 56, a ring gear 58 meshing with the planetary pinions 57, and a carrier 59 rotatably carrying the planetary pinions 57 and connected to the free end of the first output shaft 52 of the sub transmission 50. A parking gear 61 is formed on the outer peripheral surface of a cylinder 60 which is connected to the carrier 59. The arrangement is such that, when a shift lever (not shown) of the main transmission 10 is operated to select a parking position, a stopper 62 engages with the parking gear 61 thereby fixing the first output shaft 52.

The frictional engagement means, i.e., clutches and brakes, of the sub transmission 50 are selectively operated to be engaged and disengaged by a sub hydraulic controller 400 which is disposed in an oil pan 63 under the sub transmission case 51.

Figure 3:
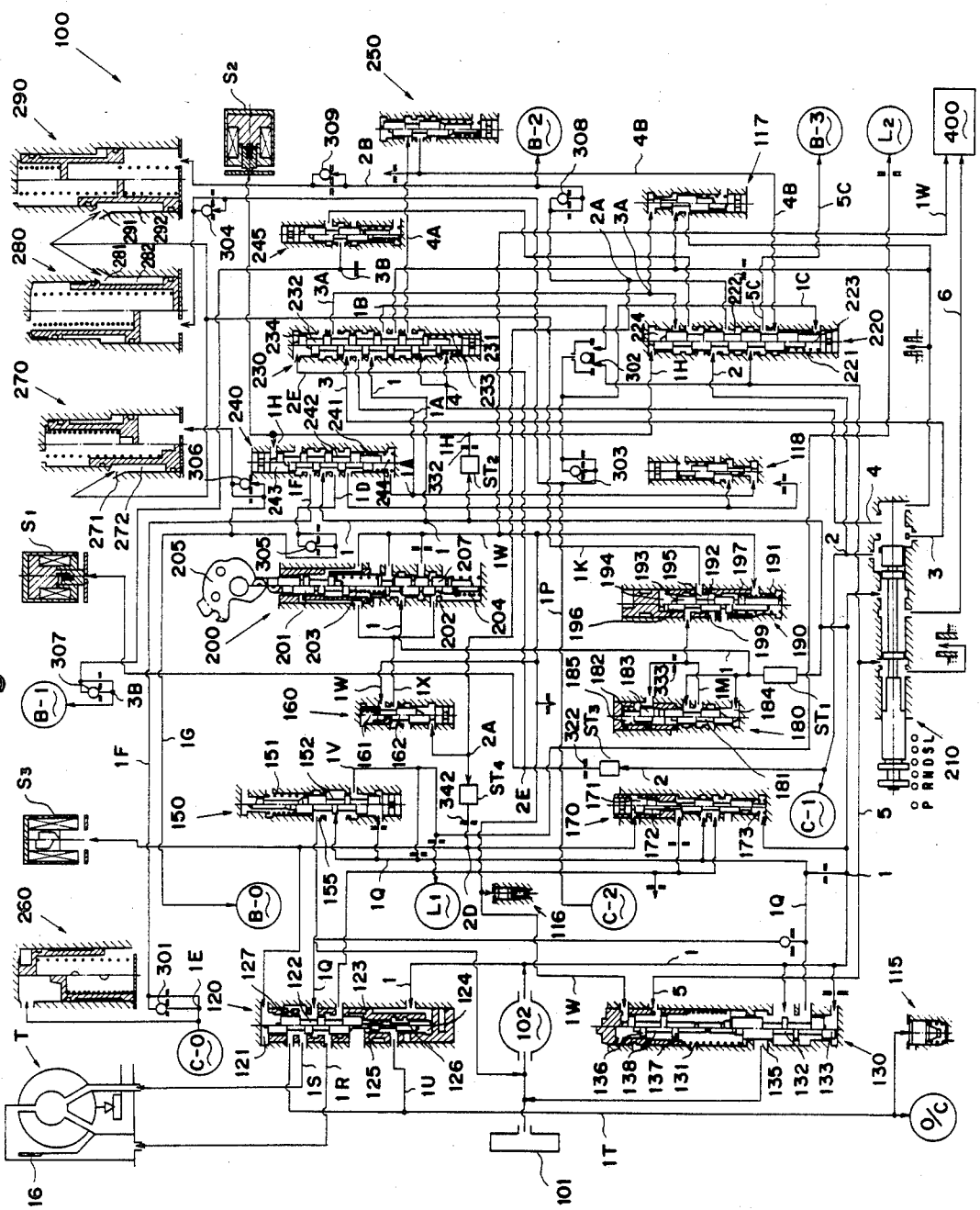
FIG. 3 is a hydraulic circuit diagram of a hydraulic controller for an automatic transmission.

FIG. 3 shows the detail of the main hydraulic controller 100 for controlling the main transmission 10.

As will be seen from this Figure, the main hydraulic controller 100 has the following parts: an oil strainer 101; an oil pump 102; a cooler by-pass valve 115 for regulating the oil pressure in an oil cooler O/C; a pressure relief valve 116; a release clutch control valve 117; a release brake control valve 118; a lock-up relay valve 120; a pressure regulator valve 130 for regulating the pressure of a working fluid or oil which is supplied by the oil pump 102 to an oil passage 1; a second pressure regulator valve 150 through which the oil is supplied both to a lubricating oil supply passage L1 leading to the main transmission 10 and a working oil supply passage L2 for the sub transmission 50; a cut-back valve 160; a lock-up control valve 170; a first accummulator control valve 180; a second accummulator control valve 190; a throttle valve 200; a manual valve 210 which distributes the line pressure in the oil passage 1 selectively to oil passages 2 to 6; a 1-2 shift valve 220; a 2-3 shift valve 230; a 3-4 shift valve 240; an intermediate coast modulator valve 245 which regulates the pressure of the oil supplied to the brake B1; a low coast modulator valve 250 for regulating the pressure of the oil supplied to the hydraulic servomotor B-3; an accummulator 260 for smoothing the engagement of the clutch C0; an accummulator 270 for smoothing the engagement of the brake B0; an accummulator 280 for smoothing the engagement of the clutch C2; an accummulator 290 for smoothing the engagement of the brake B2; hydraulic servomotors C-0, C-1 and C-2 for the clutches C0, C1 and C2; hydraulic servomotors B-0, B-1, B-2 and B-3 for the brakes B0, B1, B2 and B3; flow-rate control valves for controlling the flow rates of oil flowing therethrough, the flow-rate control valves being respectively denoted by 301, 303, 304, 305, 306, 307, 308 and 309 and provided with respective check valves; a shuttle valve 302; oil strainers ST1, ST2, ST3 and ST4; a first solenoid valve S1 adapted for controlling the 2-3 shift valve 230 under the control of a later-mentioned electronic controller or computer 600; a second solenoid valve S2 adapted for controlling both the 1-2 shift valve 220 and the 3-4 shift valve 240 under the control of the computer 600; a third solenoid valve S3 adapted to control both the lock-up relay valve 120 and the lock-up control valve 170 under the control of the computer 600; and oil passages providing communication between the valves and the hydraulic cylinders of respective clutches and brakes.

The working oil is sucked by the hydraulic pump 102 from the oil pan 40 through an oil strainer 101, and is supplied to the oil passage 1 at a predetermined line pressure regulated by the pressure regulator valve 130.

The pressure regulator valve 130 has a spool 132 which is urged by a spring 131 disposed on the upper side thereof as viewed in FIG. 3, and a plunger 138 disposed in series with and in contact with the spool 132. In operation, a throttle pressure introduced through an oil passage 1W and acting on the uppermost land 136 produces a force which, together with the force produced by the spring 131, acts to cause a downward displacement of the spool 132. When reversing, downward force is produced also by the line pressure introduced through the oil passage 5 and acting on the lowermost land 137 of the plunger 138, in addition to the downward force produced by the throttle pressure and the spring 131. On the other hand, the line pressure is fed back to the lowermost land 133 of the spool 132 so as to produce a force which acts to displace the spool 132 upwardly. In consequence, the spool 132 is displaced to a position where the upward force and the downward force balance each other, so as to change the area of communication between the oil passage 1 and the oil passage 1Q, as well as the area of communication between the oil passage 1 and the drain port 135, thereby maintaining the line pressure at a level corresponding to the state of running of the vehicle.

The throttle valve 200 has a throttle plunger 201 which is adapted to be displaced by a cam 205 which in turn is rotated in accordance with the amount by which the accelerator pedal is depressed. The throttle valve 200 also has a spool 202 disposed on the lower side of the throttle plunger 201 as viewed in FIG. 3 with a spring 203 acting as an intermediary therebetween. The stroking of the throttle plunger 201 causes an axial movement of the spool 202 through the action of the spring 203 so that the spool 202 changes the line pressure supplied from the oil passage 1 to the throttle pressure corresponding to the throttle opening and delivers the throttle pressure to the oil passage 1W.

The second pressure regulator valve 150 has a spool 152 which is urged by a spring 151 acting on the upper side thereof as viewed in FIG. 3. The spool 152 is axially displaced to a position where a balance is obtained between the downward force exerted by the spring 151 and an upward force which is generated by an oil pressure fed back through the oil passage 1Q and acting on the lower side thereof, thus varying the area of communication between the oil passage 1Q and the lubricating oil supply passage 1V, as well as the area of communication between the oil passage 1Q and the drain port 155, thereby regulating the pressure in the oil passage 1Q to a predetermined secondary line pressure (torque converter pressure), while delivering excessive oil to the oil passage 1V. The oil supplied to the oil passage 1V is distributed both to the lubricating oil passage L1 of the main transmission 10 and the working oil supply passage L2 leading to the sub transmission 50.

The manual valve 210 is directly connected to the shift lever arranged in the vicinity of the driver's seat, and is adapted to take one of the positions P (parking), R (reverse), N (neutral), D (drive), S (second) and L (low) as the shift lever is manually operated such as to select one of the ranges P, R, N, D, S and L.

The first solenoid valve S1, when not energized, blocks the oil passage 2E which is communicated with the oil passage 2 through an orifice 322. In this state, a solenoid pressure of high level equal to that of the line pressure is maintained in the oil passage 2E. However, when energized, the first solenoid valve S1 allows the oil passage 2E to communicate with the drain, so that the solenoid pressure in the oil pasage 2E is reduced to a low level.

Similarly, the second solenoid valve S2 operates, when not energized, to establish a solenoid pressure of a high level in the oil passage 1H which communicates with the oil passage 1 through an orifice 332 and, when energized, to drain the oil in the oil passage 1H thereby reducing the solenoid pressure to a low level.

The third solenoid valve S3 controls the pressure in an oil chamber 121 which is formed on the upper side of the lock-up relay valve 120 as viewed in FIG. 3 and connected to the oil passage 2D which in turn is communicated with the oil passage 2A through an orifice 342. The third solenoid valve S3 also controls the pressure in an oil chamber 171 which is formed on the upper side of the lock-up control valve 170 as viewed in FIG. 3. More specifically, the third solenoid valve S3 operates, when energized, to establish the high solenoid pressure in the oil chambers 121 and 171 thereby displacing the spools 122 and 172 downwardly as viewed in FIG. 3, whereas, when de-energized, it allows the oil chambers 121 and 171 to be drained so as to reduce the solenoid pressure to a low level, thereby allowing the spools 122 and 172 to return to the upper positions by virtue of the force produced by the line pressure derived from the oil passage 1 and the forces of the springs 123 and 173.

The 1-2 shift valve 220 has a spool 222 which is urged by a spring 221 acting on the lower side thereof as viewed in FIG. 3. When the solenoid pressure of the high level is maintained in the oil passage 1H by the second solenoid valve S2 which is not energized, this high solenoid pressure is introduced into an oil chamber 224 which is defined on the upper side of the 1-2 shift valve 220, so that the spool 222 is moved downwardly to a first speed position. Conversely, when the second solenoid valve S2 is energized to drain the oil passage 1H and thereby to reduce the solenoid pressure to the low level, the spool 222 is returned to the upper position, away from the first speed position. When a third speed or a fourth speed is selected, the line pressure is introduced into an oil chamber 223 which is formed on the lower side of the spool 222 through the oil passage 1, 2-3 shift valve 230 and then through the oil passage 1C which is communicated with the oil passage 1B, so that the spool 222 is held at the upper position regardless of the level of the solenoid pressure.

The 2-3 shift valve 230 has a spool 232 urged by a spring 231 acting on the lower side thereof, as viewed in FIG. 3. When the first solenoid valve S1 is energized, the solenoid pressure in the oil passage 2E takes the low level, so that the spool 232 is held by the force of the spring 231 at an upper position, as viewed in FIG. 3, where it serves for first and second speeds, as well as for reversing. Conversely, when the first solenoid valve S1 is not energized, the high solenoid pressure established in the oil passage 2E is applied to an oil chamber 234 so as to produce a force which acts to displace the spool 232 downwardly, as viewed in FIG. 3, to a lower position where it serves for the third speed and fourth speed operations. However, when the line pressure is supplied to an oil chamber 233 which is formed on the lower side of the spool 232, the spool 232 is fixed at the upper position regardless of the level of the solenoid pressure.

The 3-4 shift valve 240 has a spool 242 which is urged by a spring 241 acting on the lower side thereof. When the second solenoid valve S2 is not energized, the solenoid pressure of the high level is introduced through the oil passage 1H into an oil chamber 243 on the upper side of the spool 242, so that the spool 242 is held at a lower position as viewed in FIG. 3 where it serves for fourth speed (overdrive) operation. In contrast, when the second solenoid valve S2 is energized, the oil passage 1H is drained so that the spool 242 is set at an upper position where it serves for operations other than that for the fourth speed. When the line pressure is fed to an oil chamber 244 defined on the lower side of the spool 242 from the oil passage 1 or the oil passage 3 via the 2-3 shift valve 230 and the oil passage 1A, the spool 242 is fixed at the upper position by the force generated by the line pressure and the force of the spring 241.

The cut-back valve 160 has a spool 162 which is displaced by a downward force exerted by a spring 161 and an upward force produced by the line pressure introduced through the oil passage 2A. More specifically, when the line pressure is supplied through the oil passage 2A, the spool 162 is set at the upper position as viewed in FIG. 3 so as to bring the oil passage 1X into communication with the oil passage 1W which maintains the throttle pressure mentioned before, thereby outputting the throttle pressure as the cut-back pressure which is applied to the lower land 207 of the spool 202 of the throttle valve 200, thereby reducing the level of the throttle pressure in the oil passage 1W. The reduction in the throttle pressure causes the spool 132 of the pressure regulator valve 130 to move upwardly, thereby allowing the line pressure in the oil passage 1 to be relieved through a drain port 135, thus effecting a so-called "cut-back" of the line pressure.

The first accummulator control valve 180 has a spool 181 disposed at a lower portion thereof as viewed in FIG. 3, and a plunger 183 connected in series to the spool 181 and downwardly urged by a spring 182. In operation, the spool 181 is axially displaced so as to attain a balance between an upward force produced by the line pressure introduced into a lower oil chamber 184 through the oil passage 1 and a downward force which is the sum of the force of the spring 182 and the force produced by the output pressure from the oil passage 1M to an upper oil chamber 185 through an orifice 333, thereby producing the output pressure through regulating the line pressure which is transmitted from the oil passage 1. The thus obtained output pressure is delivered to the second accummulator control valve 190 through the oil passage 1M.

The second accummulator control valve 190 has a spool 192 which is urged by a spring 191 acting on the lower side thereof. The spool 192 has an upper land 193 in which is formed an orifice 196 which provides communication between an upper oil chamber 194 formed on the upper side of the spool 192 and an intermediate oil chamber 195 formed under the land 193. The spool 192 is axially displaced upon balance being attained between an upward force which is the sum of the force exerted by the spring 191 and the force produced by a throttle modulator pressure which acts on a lower land 197 of the spool through the oil passage 1W, and a downward force which is produced by a feedback pressure fed back from the oil passage 1M to act in the upper oil chamber 194 through the orifice 196, thereby producing an output pressure at the oil passage 1M. The output pressure from the oil passage 1M is supplied through the oil passage 1K to back-pressure chambers 272, 282 and 292 of the accummulators 270, 280 and 290 through respective back-pressure ports 271, 281 and 291, thereby controlling the back pressure in these accummulators. The back pressure in turn is applied through the oil passage 1K to the upper land 193 of the spool 192, so that the latter is displaced downwardly as viewed in FIG. 3, thereby allowing the oil passage 1K to be communicated with a drain port 199 through an intermediate oil chamber 195, whereby the back pressure in the oil passage 1K is relieved.

As stated before, the manual valve 210 is operated manually by means of the shift lever (not shown) of the main transmission 10 disposed in the vicinity of the driver's seat. The shift lever is adapted to be operated manually by the driver so as to take one of the ranges of P (parking), R (reverse), N (neutral), D (drive), S (second) and L (low) of the main shift position Mp. Table 1 shows the gear stages, i.e., the fourth (4), third (3), second (2) and first (1) gears obtainable in the respective ranges of the main shift position Mp, as well as the states of clutches and brakes corresponding to the respective gear stages.

TABLE 1

| Mp | S1 | S2 | S3 | C1 | c2 | C0 | B1 | B2 | B3 | B0 | F1 | F2 | F3 |
|---|---|---|---|---|---|---|---|---|---|---|---|---|---|
| P | O | X | X | X | X | E | X | X | X | X | f | f | f |
| R | O | X | X | X | E | E | X | X | E | X | f | f | f |
| N | O | X | X | X | X | E | X | X | X | X | f | f | f |
| D |   |   |   |   |   |   |   |   |   |   |   |   |   |
| 1 | O | X | X | E | X | E | X | X | X | X | f | L | (L) |
| 2 | O | O | ⊙ | E | X | E | X | E | X | X | L | f | (L) |
| 3 | X | O | ⊙ | E | E | E | X | E | X | X | f | f | (L) |
| 4 | X | X | ⊙ | E | E | X | X | E | X | E | f | f | f |
| S |   |   |   |   |   |   |   |   |   |   |   |   |   |
| 1 | O | X | X | E | X | E | X | X | X | X | f | L | (L) |
| 2 | O | O | ⊙ | E | X | E | E | E | X | X | (L) | f | (L) |
| 3 | X | O | ⊙ | E | E | E | X | E | X | X | f | f | (L) |
| (3) | X | X | X | E | E | E | X | E | X | X | f | f | (L) |
| L |   |   |   |   |   |   |   |   |   |   |   |   |   |
| 1 | O | X | X | E | X | E | X | X | E | X | f | (L) | (L) |
| 2 | O | O | X | E | X | E | E | E | X | X | (L) | f | (L) |

TABLE 1-continued

| Mp | S1 | S2 | S3 | C1 | c2 | C0 | B1 | B2 | B3 | B0 | F1 | F2 | F3 |
|---|---|---|---|---|---|---|---|---|---|---|---|---|---|
| (1) | X | X | X | E | X | E | X | X | E | X | f | (L) | (L) |

In table 1, marks O and X represent the fact that the solenoid valves S1 and S2 are energized and de-energized, respectively, whereas the mark ⊙ shows that the solenoid valve S3 is energized to lock-up the transmission. The mark X appearing in the column of the solenoid valve S3 indicates that the solenoid valve S3 is de-energized to release the lock-up state. Symbol E shows that the clutches and the brakes are engaged, while the symbol X in the columns of clutches and brakes indicate that the clutches and brakes are released. A symbol L indicates that the one-way clutch is in the engaged state when the power is transmitted from the engine even though the power transmission is ensured also by a clutch or a brake connected in parallel with this one-way clutch, i.e., it indicates that the one-way clutch is locked. A symbol (L) shows that the one-way clutch is engaged only in the engine driving condition but is disengaged in the engine braking condition. Finally, a symbol f indicates that the clutch is in the free state.

Table 2 shows the states of communication between the oil passage 1 and the oil passages 2 to 6, as obtained in the respective positions of the shift lever of the main transmission 10.

TABLE 2

|  | P | R | N | D | S | L |
|---|---|---|---|---|---|---|
| Oil passage 2 | X | X | X | O | O | L |
| Oil passage 3 | X | X | X | X | O | O |
| Oil passage 4 | X | X | X | X | X | O |
| Oil passage 5 | X | O | X | X | X | X |
| Oil passage 6 | X | O | O | O | O | O |

In Table 2, a mark O shows establishment of the communication that allows delivery of the line pressure to the respective oil passages, whereas a mark X indicates that the respective oil passages are drained.

The operation of the main hydraulic controller 100 in response to the manual shifting operation of the manual valve 210 will be explained hereinunder.

When Manual Valve 210 Selects N or P Range

In this state, the oil passage 1 communicates with none of the oil passages 2 to 5, as will be seen from Table 2, and the first and second solenoid valves S1 and S2 are energized and de-energized, respectively, as shown in Table 1. The spool 222 of the 1-2 shift valve 220 is therefore displaced to the lower position by the force produced by the high solenoid pressure, while the spool 232 of the 2-3 shift valve 230 takes the upper position under the force of the spring 231, thus allowing the line pressure to be supplied from the oil passage 1A to the lower oil chamber 244 of the 3-4 shift valve 240 and thereby upwardly displacing the spool 242 of the 3-4 shift valve 240. In this state, only the servomotor C-0 of the clutch C0 is communicated with the oil passage 1 through the 3-4 shift valve 240, oil passage 1F, flow-rate control valve 301 with check valve, and the oil passage 1E, while detouring the manual valve 210, so that only the clutch C0 is engaged.

When Manual Valve 210 Selects D Range

In this state, the line pressure is supplied to the oil passage 2, so that the clutch C1 is engaged.

The vehicle then starts with the first speed gear. Namely, when the D range is selected, the first solenoid valve S1 and the second solenoid valve S2 are energized and de-energized, respectively, as shown in Table 2, so that the spool 222 of the 1-2 shift valve 220 takes the lower position. In this state, the oil passages 3B and 2A leading to the brakes B1 and B2 are drained, and the oil passage 5C leading to the brake B3 is not supplied with oil, so that the brakes B1, B2 and B3 are released. At the same time, since the spool 232 of the 2-3 shift valve 230 is set at the upper position, the oil passage 1B is drained and the clutch C0 thereby disengaged. Meanwhile, the line pressure is supplied from the oil passage 1A to the lower oil chamber 244 of the 3-4 shift valve 240, so that the spool 242 is held at the upper position such as to maintain the clutch C0 in the engaged state by the oil pressure which is supplied from the oil passage 1 through the 3-4 shift valve 240 and the oil passage 1F. On the other hand, the oil passage 1B is drained so that the clutch C2 is disengaged and the brake B0 is released because the oil passage 1D is drained as a result of the supply of the line pressure to the oil passage 1F. In consequence, the power train is completed with the first speed gear, thereby starting the vehicle with the first speed gear.

Up-shift to the second speed gear is conducted in accordance with the state of running of the vehicle, in a manner which will be explained hereinunder.

When the vehicle running speed has reached a predetermined level, the computer 600 produces an output which allows the second solenoid valve S2 to be energized, so that the solenoid pressure acting in the upper oil chamber 224 of the 1-2 shift valve 220 is reduced to the low level, thereby causing the spool 222 of the 1-2 shift valve 220 to be moved upward, whereby the oil is supplied to the servomotor B-2 of the brake B2 from the oil passage 2, 1-2 shift valve 220, oil passage 2A, flow-rate control valve 308 with check valve, and the oil passage 2B, thus engaging the brake B2 and accomplishing the up-shift to the second speed gear.

As the vehicle speed is further increased, an up-shift to the third speed gear is effected in the following way. Namely, the computer 600 produces an output which serves to de-energize the first solenoid valve S1, so that the spool 232 of the 2-3 shift valve 230 is moved downwardly, thereby engaging the clutch C2 by the oil pressure which is supplied from the oil passage 1 through the 2-3 shift valve 230, oil passage 1B, shuttle valve 302, flow-rate control valve 303 with check valve and the oil passage 1P. Meanwhile, the line pressure is supplied from the oil passage 1C to the lower oil chamber 223 so as to fix the spool 222 of the 1-2 shift valve 220 at the upper position where it serves for speed other than the first speed.

For up-shifting to the fourth speed gear, the computer 600 produces an output which serves to de-energize the second solenoid valve S2 so that the solenoid pressure which has been supplied from the oil passage 1H to the upper oil chamber 243 of the 3-4 shift valve 240 is returned to the high level, thus allowing the spool 242 of the 3-4 shift valve 240 to be moved downwardly. As a result, the oil passage 1F is drained, while the oil passage 1D is supplied with the pressurized oil, so that the flow-rate control valve 305 with check valve is supplied with the pressurized oil through the oil passage 1G, whereby the clutch C0 is disengaged and the brake B0 engaged, thus accomplishing the up-shift to the fourth speed gear.

When Manual Valve 210 Selects S Range

In this case, the line pressure is supplied not only to the oil passage 2 but also to the oil passage 3, as will be seen from Table 2, and the up-shift from the first speed gear to the second and third speed gears is conducted in the same manner as that in the case of the D range. However, up-shift to the fourth speed gear is prevented because the spool 242 of the 3-4 shift valve 240 is held at the upper position by the line pressure which is supplied to the lower oil chamber 244 of the 3-4 shift valve 240 from the oil passage 1 or the oil passage 3 through the 2-3 shift valve 230 and the oil passage 1A. When the second speed gear is selected, the line pressure is supplied to the servomotors of the clutches C0 and C1 and to the servomotor of the brake B2 as in the case of the D range. In addition, the line pressure is supplied also to the intermediate coast modulator valve 245 from the oil passage 3 through the 2-3 shift valve 230, oil passage 3A, 1-2 shift valve 220 and the oil passage 3D, so that pressurized oil of a pressure regulated by the intermediate coast modulator valve 245 is supplied to the oil passage 3B, thereby engaging the brake B1. Thus, the second speed in the S range permits the engine braking effect and affords a greater torque transmission capacity by virtue of the fact that both the brakes B2 and B1 are always held in the engaged state. It is to be understood also that, when the manual valve 210 is operated from the D range to the S range during running at fourth speed gear in the D range, the line pressure is introduced into the lower oil chamber 244 of the 3-4 shift valve 240, thereby effecting down-shift to the third speed gear without delay.

When Manual Valve 210 Selects L Range

In this case, the line pressure is supplied to the oil passages 2, 3 and 4 as will be seen from Table 2. The up-shift from the first speed gear to the second speed gear is conducted in the same manner as that in the D range but the up-shift to the third speed gear is prevented because the spool 232 of the 2-3 shift valve 230 is fixed at the upper position by the line pressure introduced into the lower oil chamber 233 of the 2-3 shift valve 230 from the oil passage 4. When the first speed gear is selected, the oil pressure is transmitted to the servomotor B-3 from the oil passage 4 through the 2-3 shift valve 230, oil passage 4A, low coast modulator valve 250, oil passage 4B, 1-2 shift valve 220 and the oil passage 5C, so that the brake B3 is held in the engaged state thereby allowing engine braking effect. When the second speed gear is selected, the operation is identical to that followed when the manual shift valve 210 selects the S range. It is to be understood also that, when the manual valve 230 is shifted to the L range during running with the third speed gear in the S range, down-shift to the second speed gear is effected without delay by the introduction of the line pressure into the lower oil chamber 233 of the 2-3 shift valve 230. Then, when the vehicle decelerates to a predetermined speed, the computer 600 produces an output for energizing the second solenoid valve S2, thereby effecting a down-shift from the second speed gear to the first speed gear.

When Manual Valve 210 Selects R Range

In this case, the pressure exists in the oil passage 5, while the oil passages 2,3 and 4 are drained, as will be understood from Table 2. Since no pressure exists in the oil passages 2 and 3 leading to the servomotors of the clutch C1 and the brakes B1, B2, the clutch C1 and the brakes B1, B2 are released. The oil pressure supplied to the oil passage 5 is transmitted to the servomotor C-2 through the shuttle valve 302, flow-rate control valve 303 with check valve and the oil passage 1P, so that the clutch C2 is engaged. At the same time, the spool 222 of the 1-2 shift valve 220 is held in the upper position because the line pressure is supplied to the lower oil chamber 223 of this valve through the oil passage 1C, so that the line pressure is supplied to the oil passage 5C thereby engaging the brake B3. Meanwhile, the spool 232 of the 2-3 shift valve 230 is held in the upper position because the solenoid pressure acting in the upper oil chamber 243 of this valve reaches the low level as a result of energization of the first solenoid valve S1. Therefore, the line pressure is introduced from the oil passage 1 to the lower oil chamber 244 of the 3-4 shift valve 240 through the 2-3 shift valve 230 and the oil passage 1A, so that the spool 242 of the 3-4 shift valve is held in the upper position so as to allow the line pressure to be transmitted to the servomotor C-0 from the oil passage 1 through the 3-4 shift valve 240 and the oil passage 1F, thus engaging the clutch C0. At the same time, the oil passage 1D leading to the servomotor B-0 is drained so that the brake B0 is released, thus allowing reversing of the vehicle.

When the manual valve 210 is either in the D or S range, the line pressure is transmitted to the oil passage 2. If the spool 222 of the 1-2 shift valve 220 is in the upper position for speed ranges other than first speed, the line pressure is transmitted further to the oil passage 2A and is then introduced into the upper oil chamber 121 of the lock-up relay valve 120 through the oil passage 2D. When the line pressure exists in the upper oil chamber 121, if the third solenoid valve S3 is energized in response to the output from the computer 600 so as to maintain the pressure in the upper oil chamber 121 at the high level, the spool 122 of the lock-up relay valve 120 is moved downwardly, thereby bringing the oil passage 1Q into communication with the oil passage 6B. Consequently, the direct clutch 16 in the torque converter T is engaged, thereby switching the torque converter T into the direct-coupling state.

In contrast, if the line pressure does not exist in the oil passage 2A or if the solenoid pressure of the low level exists in the upper oil chamber 121 because of de-energization of the third solenoid valve S3 by the output of the computer 600, the spool 122 is held in the upper position by the force produced by the line pressure introduced into the lower oil chamber 124 from the oil passage 1. In this state, the oil passage 1Q is held in communication with the oil passage 1R, so that the direct clutch 16 in the torque converter T is held in the disengaged state.

When the spool 122 is held in the upper position, i.e., when the torque converter T is not locked up, the secondary line pressure (torque converter pressure) supplied from the torque converter T to the oil passage 1S is supplied to the oil cooler 0/C through the lock-up relay valve 120 and the oil passage 1T. In contrast, when the spool 122 is held in the lower position, i.e., when the torque converter is locked up, the pressurized oil is supplied to the oil cooler 0/C from the oil passage 1Q through the orifice 127 in the sleeve 125 and the oil passage 1T and also from the oil passage 1 through the orifice 126 in the sleeve 125 of the lock-up relay valve 120 and the oil passages 1U and 1T.

Figure 4:
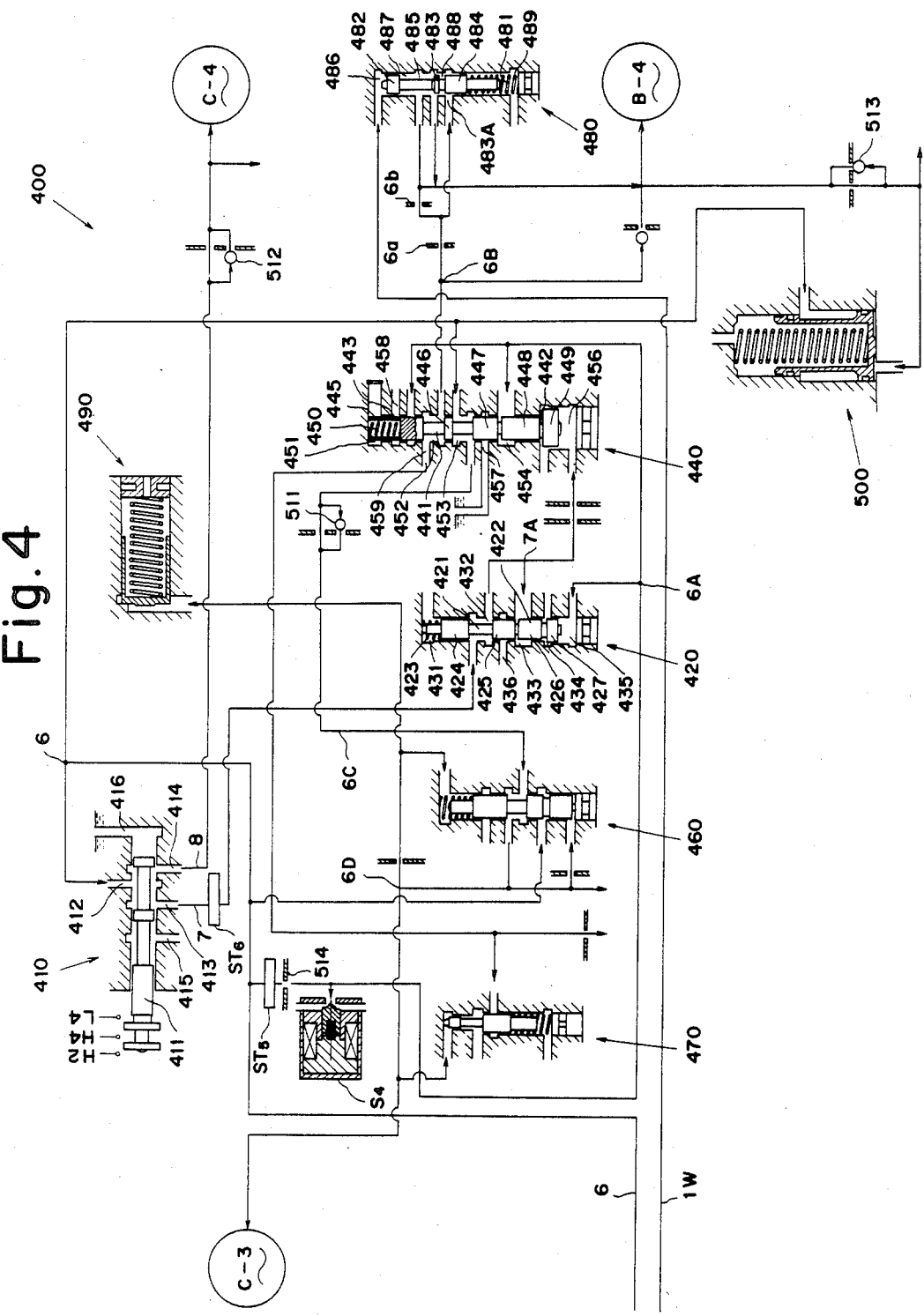
FIG. 4 is a hydraulic circuit diagram of a hydraulic controller for a sub transmission.

FIG. 4 shows the detail of the sub hydraulic controller 400 for controlling the four-wheel drive sub transmission 50.

The sub hydraulic controller 400 is constituted by the following major parts: a transfer manual valve 410 operated manually by means of a shift lever provided in the vicinity of the driver's seat and adapted to distribute the pressurized oil supplied through the oil passage 6 of the main hydraulic controller 100 both to the oil passages 7 and 8; a relay valve 420; an inhibitor valve 440 for switching the states of engagement of the clutch C3 and the brake B4; a third accummulator control valve 460; a shift timing valve 470; an orifice control valve 480 for smoothing the engagement of the brake B4; an accummulator 490 for smoothing the engagement of the clutch C3; an accummulator 500 for smoothing the engagement of the brake B4; hydraulic servomotors C-3, C-4 and B-4 of the clutches C3, C4 and the brake B4; flow-rate control valves 511, 512 and 513 provided with check valves and adapted to control the flow rates of the pressurized oil flowing therethrough; oil strainers ST5 and ST6; a fourth solenoid valve S4 adapted to be selectively operated by an output from the computer 600; and oil passages providing communication between respective valves and servo cylinders of respective clutches and brakes.

The transfer manual valve 410 has a spool 411 which is directly connected to a shift lever (not shown) provided in the vicinity of the driver's seat. The transfer manual valve 410 also has an in-port 412 communicating with the oil passage 6 of the main hydraulic controller 100 for the main transmission 10, an out-port 413 communicating with the oil passage 7, an out-port 414 communicating with the oil passage 8, and drain ports 415 and 416. When the spool 411 of the transfer manual valve 410 is held in a two-wheel drive direct coupling (H2) position, the oil passage 6 is communicated with the oil passage 7, while the oil passage 8 is communicated with the drain port 416. When the spool 411 is held in a four-wheel drive direct coupling (H4) position, the oil passage 6 communicates with both the oil passage 7 and the oil passage 8. Finally, when the spool 411 is held in a reduced speed four-wheel drive (L4) position, the oil passage 6 is communicated with the oil passage 8, while the oil passage 7 is drained through the drain port 415.

The relay valve 420 has a spool 421 and a plunger 422 arranged in series with the spool 421. The spool 421 has lands 424 and 425 of an equal diameter and arranged at the upper and lower ends thereof, respectively, as viewed in FIG. 4, the upper land 424 being urged by a spring 423. The plunger 422 has an upper land 426 of the same diameter as the lands 424, 425 of the spool 421 and a lower land 427 of a diameter greater than the diameter of the upper land 426. The spool 421 and the plunger 422 in cooperation define an upper oil chamber 431 on the upper side of the upper land 424, a first intermediate oil chamber 432 between the upper land 424 and the lower land 425, a second intermediate oil chamber 433 between the spool 421 and the plunger 422, a third intermediate oil chamber 434 between the upper land 426 and the lower land 427, and a lower oil chamber 435 on the lower side of the lower land 427.

The operation of the relay valve 420 is as follows. When the pressurized oil is supplied to the lower oil chamber 435 from the oil passage 6A, the spool 421 and the plunger 422 are displaced upwardly, so that the oil passage 7 is breought into communication with the line pressure supply passage 7A through the first intermediate oil chamber 432, so that the supply and discharge of the line pressure to and from the lower oil chamber 456 of the inhibitor valve 440 is possible through the switching of the transfer manual valve 410. When the line pressure is supplied to the lower oil chamber 456 of the inhibitor valve 440 through the transfer manual valve 410 while the oil passage 7 is communicated with the line pressure supply passage 7A, the feedback pressure is supplied to the second intermediate oil chamber 433 so that the spool 421 is fixed at the upper position. In this state, if the solenoid valve S4 is energized in response to the output from the computer 600 so as to allow the lower oil chamber 435 to be drained, the plunger 422 alone is moved to the lower position, while the spool 421 remains in the upper position, so as to maintain the supply of the line pressure to the lower oil chamber 456 of the inhibitor valve 440. If the line pressure in the oil passage 7 is relieved through the transfer manual valve 410 in this state, or if the lower oil chamber 435 of the relay valve is drained as a result of energization of the fourth solenoid valve S4 by the output from the computer 600 while the line pressure in the lower oil chamber 456 of the inhibitor valve 440 being drained through the transfer manual valve 410 which provides communication between the oil passage 7 and the line pressure supply passage 7A, the spool 421 and the plunger 423 are displaced downwardly so as to bring the line pressure supply passage 7A into communication with the drain port 436 through the first intermediate oil chamber 432. When the spool 421 is held in the lower position, the supply and discharge of the line pressure to and from the lower oil chamber 456 of the inhibitor valve 440 through the transfer manual valve 410 does not proceed, so that the spool 441 and the plunger 442 of the inhibitor valve 440 are held in the lower positions as viewed in FIG. 4.

The inhibitor valve 440 has a spool 441 which is adapted to be moved between a first position which is on the lower side as viewed in FIG. 4 and a second position which is on the upper side as viewed in FIG. 4. The spool 441 serves as a change-over valve which conducts supply and discharge of the line pressure to and from the servomotors C-3 and B-4 of the clutch C3 and the brake B4 as it is moved between the lower first position and the upper second position. The inhibitor valve 440 also has a plunger 442 disposed in series with the spool 441 and adapted to be moved between a lower first position and an upper second position. The plunger 442, when in the upper second position, holds the spool 441 in the second position. The spool 441 has an upper sleeve-like land 445, a lower land 447 and an intermediate land 446 all having an equal diameter, and a spring 450 acting on the upper land 445 thus serving as means for setting the spool 441 in the first position. On the other hand, the plunger 442 has an upper land 448 of the same diameter as the lands of the spool 441, and a lower land 449 having a greater diameter than the upper land 448. Thus, the spool 441 and the plunger 442 define an upper oil chamber 451 on the upper side of the sleeve-like land 445, a first intermediate oil chamber 452 between the sleeve-like land 445 and the intermediate land 446, a second intermediate oil chamber 453 between the intermediate land 446 and the lower land 447, an oil chamber 454 between the spool 441 and the plunger 442, and a lower oil chamber 456.

The operation of this inhibitor valve 440 is as follows. When the spool 441 is held in the lower position, i.e., the first position, the upper oil chamber 451 is communicated with the oil passage 6A through an oil port 443 in the sleeve-like land 445, while the first intermediate oil chamber 452 and the second intermediate oil chamber 453 provide, respectively, communication between the line pressure passage 6 and a speed-reduction oil passage 6B and between a direct-coupling oil passage 6C and a drain port 457.

Conversely, when the spool 441 is held in the upper position, i.e., the second position, the upper oil chamber 451 is communicated with a drain port 458 through the oil port 443 formed in the sleeve-like land 445, while the first intermediate oil chamber 452 and the second intermediate oil chamber 453 provide, respectively, communication between the speed-reduction oil passage 6B and a drain port 459 and between the oil passage 6 and the direct-coupling oil passage 6C. On the other hand, the oil chamber 454 is communicated with an oil passage 6A which delivers an oil pressure corresponding in degree to the signal supplied to the fourth solenoid valve S4. This oil pressure acting in the oil chamber 454 serves to normally bias the spool 441 to the second position, i.e., the upper position, while urging the plunger 442 to the first position, i.e., the lower position. An oil pressure maintained in the lower oil chamber 456 serves to normally maintain the plunger 442 in the second position, i.e., in the upper position.

The orifice control valve 480 is a control valve which regulates the pressure of the working oil supplied to the oil passage 6B and delivers the regulated pressure to the hydraulic servomotor B-4. The orifice control valve 480 has a spool 485 which is biased upwardly by a spring 481. The spool 485 has an upper land 482, an intermediate land 483 and a lower land 484. The orifice control valve 480 has an upper oil chamber 486 on the upper side of the upper land 482, an upper intermediate oil chamber 487 between the upper land 482 and the intermediate land 483, a lower intermediate oil chamber 488 between the intermediate land 483 and the lower land 484, and a lower oil chamber 489 accommodating the spring 481. The spool 485 has an orifice 483A through which the upper intermediate oil chamber 487 is communicated with the lower intermediate oil chamber 488.

The upper oil chamber 486 is communicated with the oil passage 1W in the main hydraulic controller 100. The position of the spool 485 is changed in accordance with the balance between the force exerted by the spring 481 and the force produced by an oil pressure corresponding to the throttle opening and applied to the upper oil chamber 486, so as to deliver the line pressure in the oil passage 6B to the hydraulic servomotor B-4 while selectively making orifices 6a and 6b in the oil passage 6B effective.

The fourth solenoid valve S4 is controlled by the computer 600 such that it is switchable from the de-energized state to the energized state on condition that the shift lever (not shown) is in the L4 (reduced-speed four-wheel drive) range and that the state of running of the vehicle meets a predetermined condition, and from the energized state to the de-energized state on condition that the shift lever is in the H2 (two-wheel drive direct coupling) or H4 (four-wheel drive direct coupling) range and that the state of running of the vehicle meets a predetermined condition. When de-energized, the fourth solenoid valve S4 acts to establish a solenoid pressure of high level equal to that of the line pressure in the oil passage 6A which communicates with the oil passage 2 through the orifice 514, whereas, when energized, it acts to drain the oil passage 6A, thereby generating a solenoid pressure of low level.

As stated before, the transfer manual valve 410 is operated by means of the shift lever of the sub transmission 50 provided in the vicinity of the driver's seat. This shift lever has sub shift positions Sp corresponding to the respective ranges of H2 (two-wheel drive direct coupling), L2 (reduced-speed two-wheel drive), H4 (four-wheel drive direct coupling) and L4 (reduced-speed four-wheel drive). The states of the brake B4 and the clutches C3 and C4, as well as the states of running of the vehicle, are shown in Table 3 in relation to respective ranges of the sub shift positions Sp.

TABLE 3

| Sp | S4 | C3 | B4 | C4 | Running Mode |
|---|---|---|---|---|---|
| H2 | O | X | E | X | L2 |
|    | α | E | X | X | H2 |
| H4 | O | X | E | E | L4 |
|    | α | E | X | E | H4 |
| L4 | X | E | X | E | H4 |
|    | β | X | E | E | L4 |

In Table 3, a symbol α represents the fact that, once the solenoid valve S4 is de-energized, the direct coupling condition is maintained even if the solenoid valve S4 is energized thereafter, whereas a symbol β represents the fact that, once the solenoid valve S4 is energized, the reduced-speed coupling condition is maintained even if the solenoid valve S4 is de-energized thereafter. A symbol E represents the fact that the clutch or the brake is held in the engaged state, while X represents the fact that the clutch or the brake is in the disengaged or released state.

Table 4 shows the respective states of communication between the oil passage 6 and the oil passages 7 and 8, in respective shift ranges of the sub transmission.

TABLE 4

|  | H2 | H4 | L4 |
|---|---|---|---|
| Oil passage 7 | O | O | X |
| Oil Passage 8 | X | O | O |

In Table 4, the mark O represents the fact that the oil passage is supplied with the line pressure, while the mark X represents the fact that the oil passage is drained.

The operations of the sub transmission 50 in respective ranges are as follows.

(A) When Transfer Manual Valve 410 Selects H2 Range

In this case, the oil passage 7 is supplied with the line pressure, while the oil passage 8 is drained. In consequence, the hydraulic servomotor C-4 is drained so as to disengage the clutch C4. In this state, the power of the engine is not transmitted to the sleeve 53, so that the vehicle runs in the two-wheel drive mode. When the fourth solenoid valve S4 is de-energized in accordance with the output from the computer 600, the lower oil chamber 435 of the relay valve 420 is supplied with the solenoid pressure of high level, so that the spool 421 and the plunger 422 are held in the upper positions as viewed in the drawing, whereby the oil passage 7 and the line pressure supply passage 7A are communicated with each other through the relay valve 420, thereby allowing the line pressure to be applied to the lower oil chamber 456 of the inhibitor valve 440. In consequence, the spool 441 and the plunger 442 of the inhibitor valve 440 are held in the second positions, i.e., upper positions, so that the oil passage 6B and, hence, the hydraulic servomotor B-4 are drained to release the brake B4. Since the spool 441 and the plunger 442 of the inhibitor valve 440 are held in the upper positions, the oil passage 6C is communicated with the oil passage 6 and, hence, with the oil passage 6D through the third accummulator control valve 460, thereby supplying the line pressure to the hydraulic servomotor C-3 and thus engaging the clutch C3. The sub transmission 50 therefore operates in the H2 (two-wheel drive direct coupling) range.

In this state, the spool 421 is fixed in the upper position by virtue of the line pressure fed back from the line pressure supply passage 7A to the second intermediate oil chamber 433 of the relay valve 420. Therefore, even if the fourth solenoid valve S4 is energized to supply the solenoid pressure of the low level to the lower oil chamber 435, the plunger 422 alone is moved to the lower position while the spool 421 remains in the upper position, thus maintaining the supply of the line pressure signal to the lower oil chamber 456 of the inhibitor valve 440. Thus, the sub transmission 50 is maintained in the H2 (two-wheel drive direct coupling) range, even though the fourth solenoid valve S4 is energized.

(B) When Transfer Manual Valve 410 Selects H4 Range

In this case, the line pressure is supplied both to the oil passages 7 and 8. When the fourth solenoid valve S4 is de-energized in response to the output of the computer 600, the solenoid pressure of high level is supplied to the lower oil chamber 435 of the relay valve 420, so that the spool 421 and the plunger 422 are held in the upper positions so as to provide communication between the oil passage 7 and the line pressure supply passage 7A, thereby allowing the line pressure to be supplied to the lower oil chamber 456 of the inhibitor valve 440. Consequently, the spool 441 and the plunger 442 of the inhibitor valve 440 are held in the second positions, i.e., upper positions, so that the oil passage 6B and, hence, the hydraulic servomotor B-4 are drained through the drain port 459, thereby releasing the brake B4.

Meanwhile, the oil passage 6C is held in communication with the oil passage 6 because the spool 441 and the plunger 442 of the inhibitor valve 440 are held in the second or upper positions. The oil passage 6C is communicated also with the oil passage 6D through the third accummulator control valve 460. Therefore, the line pressure is supplied to the hydraulic servomotor C-3, thereby engaging the clutch C3. On the other hand, the line pressure supplied to the oil passage 8 is introduced into the hydraulic servomotor C-4, thereby engaging the clutch C4, and thus allowing the sub transmission 50 to operate in the H4 (four-wheel drive direct coupling) range.

In this state, the line pressure is fed back to the second intermediate oil chamber 433 of the relay valve 420 from the line pressure supply passage 7A, so that the spool 421 is fixed in the upper position. When the fourth solenoid valve S4 is energized in this state, the plunger 422 alone is moved downwardly, while the spool 421 remains in the upper position, thereby maintaining the supply of the line pressure to the lower oil chamber 456 of the inhibitor valve 440 and, hence, the H4 (four-wheel drive direct coupling) range of the sub transmission 50.

(C) When Transfer Manual Valve 410 Selects L4 Range

In this case, the oil passage 7 is drained, while the oil passage 8 is supplied with the line pressure, as will be seen from Table 4. Thus, the oil passages 7 and 7A are drained, while the oil passage 8 is supplied with the line pressure, regardless of the position of the relay valve 420, so that the clutch C4 is engaged to maintain the four-wheel drive mode of the sub transmission 50.

When the transfer manual valve 410 is shifted from the high speed range H2 or H4 down to the low speed range L4, if the fourth solenoid valve S4 is de-energized in response to the output from the computer 600, the solenoid pressure of high level is supplied from the oil passage 6A to the oil chamber 454 of the inhibitor valve 440, while the line pressure which has been supplied to the lower oil chamber 456 of the same valve is drained through the oil passage 7A, relay valve 420, oil passage 7 and the transfer manual valve 410. In consequence, the plunger 442 of the inhibitor valve 440 is moved to the first or lower position, but the spool 441 of the same valve remains in the second or upper position so as to maintain the H4 (four-wheel drive direct coupling) range of the sub transmission 50.

If the fourth solenoid valve S4 has been energized in response to the output of the computer 600 when the transfer manual valve 410 is shifted to the L4 range, or if the fourth solenoid valve S4 is switched from the de-energized state to the energized state while the transfer manual valve 410 has been set in the L4 range, the solenoid pressure supplied to the oil passage 6A is changed to the low level, so that the spool 441 of the inhibitor valve 440 is set in the first or lower position by the force of the spring 450. As a result, the oil passage 6B is brought into communication with the oil passage 6, so that the hydraulic servomotor B-4 is supplied with the line pressure through the orifice 6a, orifice 6b or the orifice control valve 480, thereby engaging the brake B4. On the other hand, the oil passage 6C is communicated with the drain port 457 through the first intermediate oil chamber 452, so that the hydraulic servomotor C-3 is drained so as to disengage the clutch C3, thereby shifting the sub transmission 50 to L4 (reduced-speed four-wheel drive) range. Once the L4 range is attained, the spool 441 of the inhibitor valve 440 is not moved even if the fourth solenoid valve S4 is de-energized, because the solenoid pressure of the high level established in the oil passage 6A is supplied not only to the oil chamber 454 of the inhibitor valve 440 but also to the upper oil chamber 451 of the same valve through the oil port 443 in the sleeve-like land 445 of the spool 441, so that the sub transmission 50 is maintained in the L4 (reduced-speed four-wheel drive) range.

(D) When Transfer Manual Valve 410 is Shifted to H2 or H4 Range From L4 Range While Sub Transmission 50 is in Reduced-Speed Four-Wheel Driving Range In this case, if the fourth solenoid valve S4 has been energized by the ouput from the computer 600, the lower oil chamber 435 of the relay valve 420 is drained so that the spool 421 and the plunger 422 are held as a unit in the lower positions by the force of the spring 423. Therefore, the communication between the oil passage 7 and the oil passage 7A is interrupted by the upper land 424 and the lower oil chamber 456 of the inhibitor valve 440 is drained. In consequence, the spool 441 and the plunger 442 of the inhibitor valve 440 are held in the lower position by the force of the spring 450. As a result, the clutch C3 is released while the brake B4 is engaged, so that the sub transmission 50 is held in L2 (reduced-speed two-wheel drive) or L4 (reduced-speed fourh-wheel drive) range.

However, when the fourth solenoid valve S4 is de-energized by the output of the computer 600, the solenoid pressure of the high level is introduced into the lower oil chamber 435 of the relay valve 420 as stated before, so that the spool 421 and the plunger 422 of the relay valve 420 are moved to the upper positions so as to provide communication between the oil passage 7 and the line pressure supply passage 7A. This in turn permits the line pressure to be supplied to the lower oil chamber 456 of the inhibitor valve 440, so that the spool 441 and the plunger 442 are moved to and held in the second or upper positions. As a result, the oil passage 6B is brought into communication with the drain port 459 and, hence, drained, so as to release the brake B4. Meanwhile, the oil passage 6C is communicated with the oil passage 6 because the spool 441 and the plunger 442 are held in the upper positions. In consequence, the oil passage 6 is brought into communication with the oil passage 6D through the third accummulator control valve 460, so that the clutch C3 is engaged to changeover the sub transmission 50 to the H2 (two-wheel drive direct-coupling) range or H4 (four-wheel drive direct-coupling) range.

FIGS. 5 to 11 show a first embodiment of the transmission control device in accordance with the invention.

Figure 5:
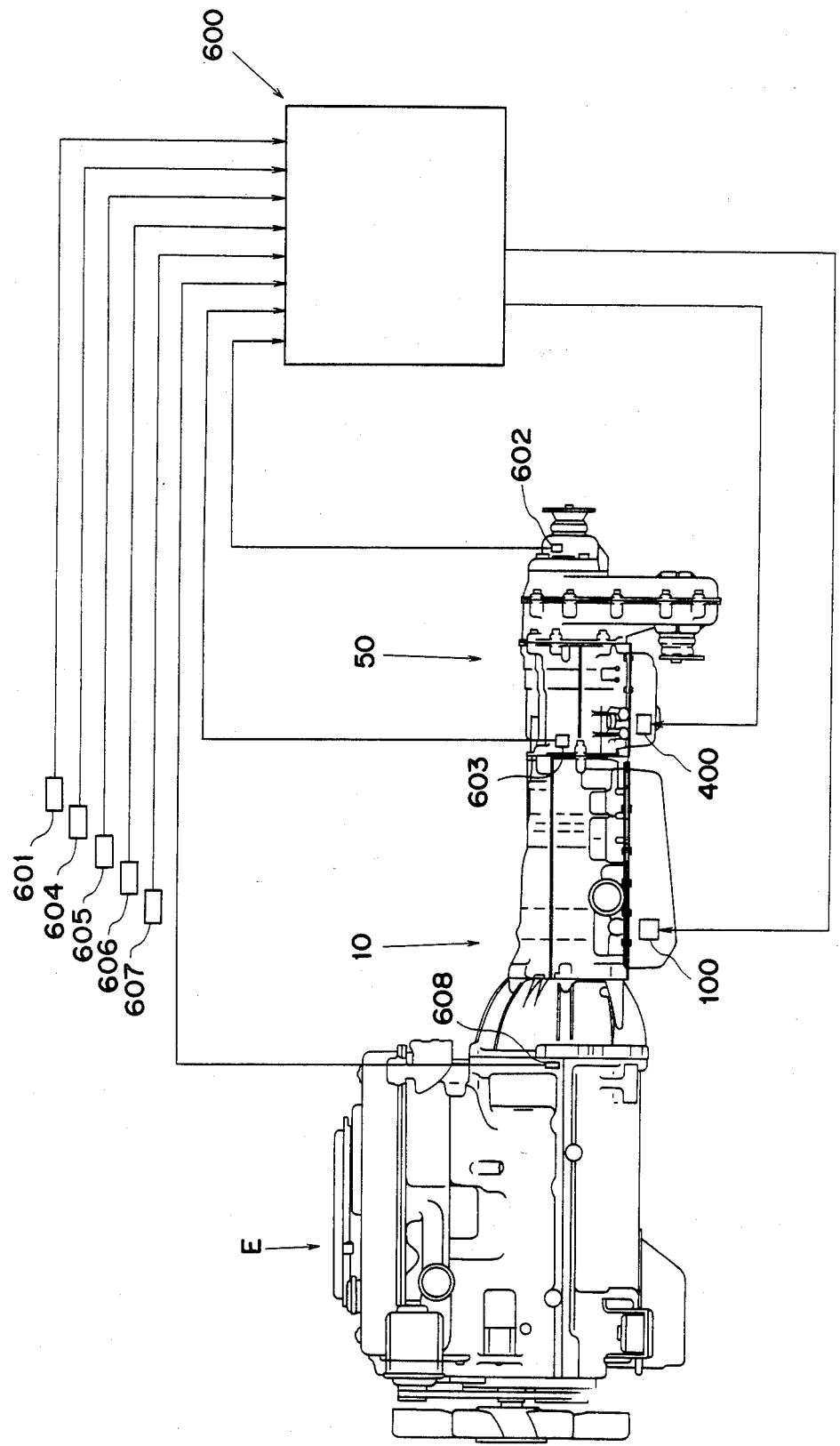
FIGS. 5 and 6 are block diagrams of an electronic control device or computer incorporated in a first embodiment of the invention.
Figure 6:
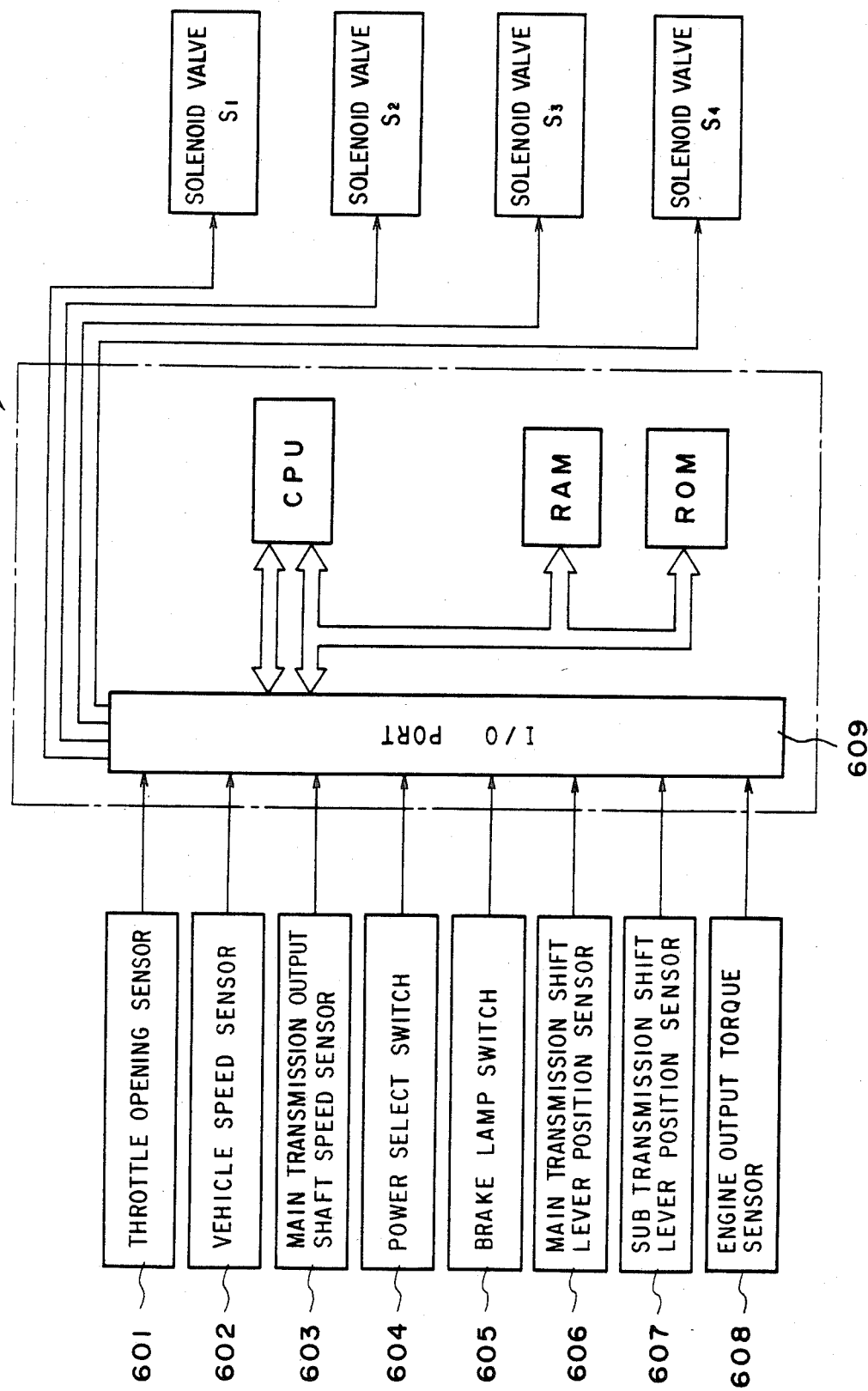

FIGS. 5 and 6 are block diagrams of the computer 600 incorporated in the control device.

The computer 600 controls the supply of the electric power to the solenoid valves S1 to S4 which are incorporated in the main hydraulic controller 100 and the sub hydraulic controller 400. The computer 600 is connected to various sensors such as a throttle opening sensor 601 for detecting the throttle opening which corresponds to the amount by which the accelerator pedal is depressed, a vehicle sped sensor 602 for converting a signal representing the rotation speed of the output shaft of the sub transmission 50 into a vehicle speed signal, a main transmission output shaft rotation speed sensor 603 for detecting the rotation speed of the output shaft 32 of the main transmission 10 which serves also as the input shaft of the sub transmission 50, a power select switch 604 for allowing the driver to select one of a plurality of speed changing patterns such as ECONOMY, NORMAL and POWER, a brake lamp switch 605, a main transmission shift lever position sensor 606 for detecting the range position Mp selected in the main transmission 10, a sub transmission shift lever position sensor 607 for detecting the range position Sp selected in the sub transmission 50, an engine output torque sensor 608 for sensing the engine output torque derived from the crankshaft of the engine, i.e., the torque inputted to the main transmission 10, I/O port 609 which serves as an input port through which the signals from the foregoing sensors representing the vehicle running state are inputted and also as an output port through which output signals are delivered to respective solenoid valves S1 to S4, a central processing unit CPU, a random access memory for conducting a shift-point processing, and a read only memory ROM which stores shift pattern data such as shift points and lock-up points.

Figure 7:
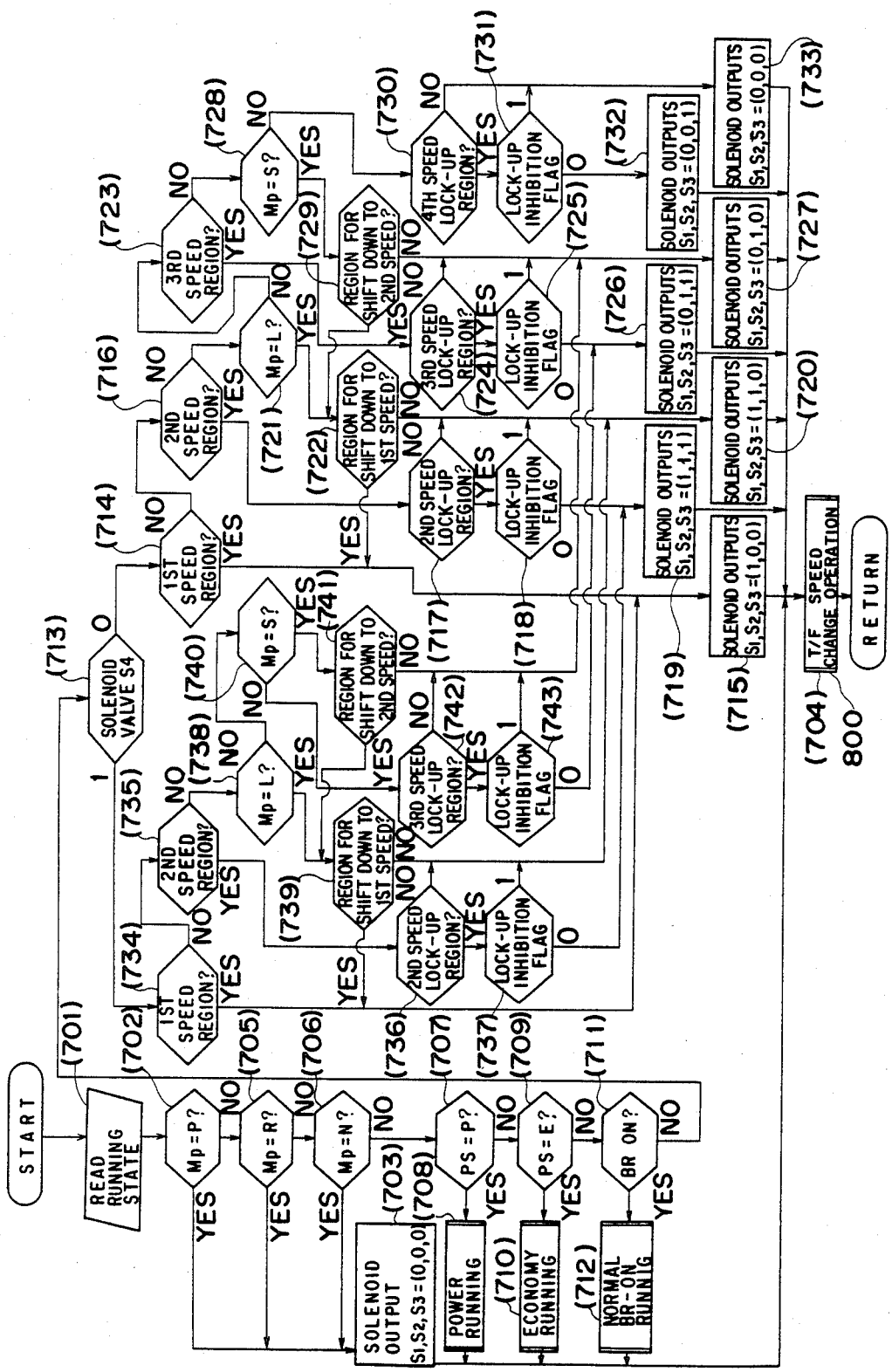
FIG. 7 is a flow chart illustrating a shifting process.

The operation of the transmission control device of the invention will be described hereinunder with reference to FIG. 7.

The engine E of a vehicle is started as the driver turns on an ignition switch (not shown). The computer 600 then reads, in s step 701, the signals representing the state of the vehicle, the signal being delivered from the aforementioned sensors such as the throttle opening sensor 601, vehicle speed sensor 602, main transmission output shaft rotation speed sensor 603, power select switch 604, brake lamp switch 605, main transmission shift lever position sensor 606, sub transmission shift lever position sensor 607, and the engine torque sensor 608. In Step 702, the shift position Mp in the main transmission 10 is judged as to whether the P (parking) range has been selected. If the answer is YES, i.e., in the case where the P range has been selected, the computer 600 produces an output which serves to de-energize the solenoid valves S1, S2 and S3 (de-energized state being represented by "0"), and the process proceeds to steps 703 and 704. However, if the answer is NO, i.e., in the case where the P range has not been selected, a judgement is conducted in a step 705 as to whether the shift position Mp is the R (reverse) range. If YES, i.e., when the R range has been selected, the process proceeds to Step 703, whereas, if not, the process proceeds to Step 706 in which a judgement is made as to whether the shift position Mp is the N (neutral) range. If YES, i.e., if the N range has been selected, the process proceeds to Step 703, whereas, if not, i.e., if the N range has not been selected, a judgement is made in Step 707 as to whether the power select position PS is set for shift pattern POWER P. If YES, the shifting of the main transmission is conducted in accordance with the shift pattern P having shift points at comparatively high speed levels, thus allowing powerful running of the vehicle (Step 708), while the process proceeds to Step 704. Conversely, when the answer is NO, i.e., when the POWER P has not been selected, a judgement is made in Step 709 as to whether the power select position PS is ECONOMY E. If YES, i.e., if the power select position is ECONOMY E, the gears of the main transmission are shifted in accordance with shift pattern ECONOMY E having shift points at comparatively low speed levels, thus affording a fuel economy of the vehicle (Step 710), while the process proceeds to Step 704. However, if NO is the answer, i.e., when the power select position SP is not E but NORMAL N, a judgement is made in Step 711 as to whether the brake lamp switch 605 has been turned on. If YES, i.e., in the case where the brake lamp switch 605 is on, the vehicle runs in the normal brake-lamp-on drive mode in which the shift points are set at comparatively high speed levels(712). The process then proceeds to Step 704. If the answer is NO, i.e., when the brake lamp switch 605 is off, the process proceeds to Step 713. In this embodiment, the state of the sub transmission 50, i.e., whether in the direct-coupling drive mode or reduced-speed drive mode, is judged through detection of the state of the fourth solenoid valve S4. Namely, the sub transmission is judged to be in the reduced-speed drive mode and direct-coupling drive mode, respectively, when the solenoid valve S4 is in the energized state (indicated by "1") and when the same is in the de-energized state (indicated by "0"). This judgement is conducted in Step 713, if the answer is NO in the judgement conducted in Step 711. If the result of judgement in Step 713 is "0", i.e., when the fourth solenoid valve S4 is in the de-energized state, a judgement is made in Step 714 as to whether the present state falls within a region for the first speed gear in a shift pattern which is obtained in a running state wherein the power select position PS is normal while the sub transmission is in the direct-coupling drive mode. If the answer is YES, i.e., when present state falls within the region for the first speed gear, the computer 600 produces, in Step 715, an output which energizes only the solenoid valve S1, while de-energizing the solenoid valves S2 and S3, and then the process proceeds to Step 704. When the answer is NO, i.e., when the present state does not fall within the region for the first speed gear, the process proceeds to Step 716 in which a judgement is conducted as to whether the present state falls within the region for the second speed gear in the shift pattern which is obtained in such a vehicle running state that the power select position PS is NORMAL while the sub transmission is in the direct-coupling drive mode. If the answer is YES, i.e., when the present state falls within the region for the second speed gear, the process proceeds to Step 717 in which a judgement is made as to whether the present state falls within the region for engaging the direct clutch for locking up the transmission with the second sped gear, at the lock-up point in the shift pattern obtained in such a vehicle running state that the power select position PS is NORMAL, while the sub transmission 50 in in the direct-coupling drive mode. If the answer is YES, i.e., when the present state falls within the region for engaging the direct clutch with the second speed gear selected, a judgement is done in Step 718 as to whether the state of a lock-up inhibition flag is "0" (DOWN) or "1" (UP). When the state of this flag is judged to be "0", i.e., when the flag state is "DOWN", the computer 600 produces in Step 719 an output for de-energizing all the solenoid valves S1, S2 and S3, whereas, when the flag state is judged to be "1", i.e., when the flag state is UP, the computer produces in Step 720 an output which permits the solenoid valves S1 and S2 to be energized, while de-energizing the solenoid valve S3. The process then proceeds to a Step 704. However, when the answer obtained in Step 717 is NO, i.e., when the present state does not fall within the region for engaging the direct clutch with the second speed gear selected, the process proceeds to Step 720.

Referring back to Step 716, when the answer obtained in this Step is NO, i.e., when the present state does not fall within the region for the second speed gear, the process proceeds to Step 721 in which a judgement is conducted as to whether the shift position Mp is the L (Low) range. When the answer is YES, i.e., when shift position Mp is set for L range, a judgement is made in Step 722 as to whether the present state falls within the region for a down-shift to the first speed gear. When the answer is YES, i.e., when the present state falls within the region for down-shift to first speed gear, the process proceeds to Step 715, whereas, when the answer is NO, i.e., when the present state falls out of the region for down-shift to the first speed gear, the process proceeds to Step 720. When the answer obtained in Step 721 is NO, i.e., when the shift position Mp has not been set for the L range, a judgement is conducted in Step 723 as to whether the present state falls within the region for the third speed gear in the shift pattern which is obtained in such a vehicle running ocndition that the power select position PS is NORMAL while the sub transmission 50 is in the direct coupling drive mode. If the answer is YES, i.e., when the present state falls within the region for the third speed gear, the process proceeds to Step 724 in which a judgement is made as to whether the present state falls within the region for engaging the direct clutch with the third speed gear selected, at the lock-up point in the shift pattern obtained in such a running state that the power select switch PS is NORMAL while the sub transmission is in the direct-coupling drive mode. When the answer is YES, i.e., when the present state falls within the region for engaging the direct clutch with the third speed gear selected, a judgement is made in Step 725 as to whether the state of the lock-up inhibition flag is "0" or "1". When the flag state is "0", i.e., when the lock-up inhibition flag is DOWN, the computer 600 produces, in Step 726, an output for energizing the solenoid valves S2, S3 and de-energizing the solenoid valve S1. However, if the answer obtained in the judgement conducted in Step 725 is "1", i.e., when the lock-up inhibition flag is UP, the computer 600 produces in Step 727 an output for energizing the solenoid valve S2, while de-energizing the solenoid valves S1 and S3. After the execution of Step 726 or 727, the process proceeds to Step 704. When the answer obtained in Step 724 is NO, i.e., when the present state does not fall within the region for engaging the direct clutch with the third speed gear selected, the process proceeds to Step 727. When the answer in Step 723 is NO, i.e., when the present state does not fall within the region for the third speed gear, a judgement is conducted in Step 728 as to whether the shift position Mp has been set for the S (second) range. If the answer is YES, i.e., when the shift position Mp has been set for the S range, a judgement is made in Step 729 as to whether the present state falls within the region for down-shift to the second speed. If the answer is YES, i.e., if the present state falls within the region for down-shift to the second speed gear, the process proceeds to Step 722. However, when the answer in Step 729 is NO, i.e., when the present state does not fall within the region for the down-shift to the second speed gear, the process proceeds to Step 727. When the answer in Step 728 is NO, i.e., when the shift position Mp has not been set for S range (In this case, the present vehicle running state falls within the region for the fourth speed gear), a judgement is done in Step 730 as to whether the present state of running falls within the region for engaging the direct clutch with the fourth gear selected, at the lock-up point in the shift pattern which is obtained in such a running state that the power select position PS is normal, while the sub transmission 50 is in the direct coupling drive mode. When answer is YES, i.e., when the present state falls within the region for engaging the direct clutch with the fourth gear selected, a judgement is made in Step 731 as to whether the state of the lock-up inhibition flag is "0" or "1". If the answer is "0", i.e., if the lock-up inhibition flag is DOWN, the computer 600 delivers in Step 732 an output for energizing the solenoid valve S3, while de-energizing the solenoid valves S1 and S2. Conversely, if the answer is "1", i.e., when the lock-up prohibition flag is UP, the computer produces in Step 733 an output for de-energizing the solenoid valves S1, S2 and S3. The process then proceeds to 704. When the answer in Step 730 is NO, i.e., when the present state falls within the region for engaging the direct clutch with the fourth speed gear selected, the process proceeds to Step 734. When the answer in Step 713 is "1", i.e., when the solenoid valve S4 is energized, a judgement is conducted in Step 734 as to whether the present running state falls within the region for the first speed gear. If the answer is YES, i.e., when the present state falls within the region for the first speed gear, the process proceeds to Step 715, whereas, when the answer is NO, i.e., when the present state does not fall within the region for the first speed gear, a judgement is conducted in Step 735 as to whether the present state falls within the region for the second speed region in the running state in which the power select position PS is normal while the sub transmission 50 is in the reduced-speed drive mode. If the answer is YES, a judgement is conducted in Step 736 as to whether the present state falls within the region for engaging the direct clutch with the second gear selected, at the lock-up point in the running state in which the power select position PS is NORMAL while the sub transmission is in the reduced-speed drive mode. If the answer is "1", i.e., when the present state falls within the region for engaging the direct clutch with the second speed gear selected, a judgement is conducted in Step 737 as to whether the state of lock-up inhibition flag is 0 or 1. If the answer is "0", i.e., if the lock-up inhibition flag is DOWN, the process proceeds to Step 717, whereas, when the answer in Step 737 is UP, i.e., if the lock-up inhibition flag is UP, the process proceeds to Step 720. When No is the answer in Step 736, i.e., when the present state of running does not fall within the region for engaging the direct clutch with the second gear selected, the process proceeds to Step 720. However, when the answer in Step 735 is NO, i.e., when the present state does not fall within the region for the second speed gear, a judgement is conducted in Step 738 as to whether the shift position Mp has been set for the L range. In the case where the answer is YES, i.e., when the shift position Mp is set in the L range, a judgement is conudcted in Step 739 as to whether the present state is for down-shift to the first speed gear. If the answer is YES, i.e., if the present state falls within the region for down-shift to the first speed gear, the process proceeds to Step 715, whereas, when the answer in Step 739 is NO, i.e., when the present state does not fall within the region for down-shift to the first speed gear, the process proceeds to Step 720. When the answer in Step 738 is NO, i.e., when the shift position Mp has not been set for the L range, a judgement is conducted in Step 740 as to whether the shift position Mp has been set for the S range. If the answer is YES, i.e., if the shift position Mp has been set for the S range, a judgement is conducted in Step 741 as to whether the present state falls within the region for down-shift to the second speed gear. However, when the answer is YES, i.e., when the present state falls within the region for down-shift to the second speed gear, the process proceeds to Step 739, whereas, if the answer in Step 741 is NO, i.e., when the present state does not fall within the region for down-shift to the second-speed gear, the process proceeds directly to Step 727. When the answer in Step 740 is NO, i.e., when the shift position Mp has not been set for S range, a judgement is done in Step 742 as to whether the present state falls within the region for engaging the direct clutch with the third speed gear selected at the lock-up point in the running state in which the power select position Ps is NORMAL, while the sub transmission 50 is in reduced-speed drive mode. If the answer is YES, i.e., if the present state falls within the region for engaging the direct clutch with the third speed gear selected, a judgement is made in Step 743 as to whether the state of the lock-up inhibition flag is "0" or "1". If the answer is "0", i.e., if the lock-up ihhibition flag is DOWN, the process proceeds to Step 726, whereas, if the answer is "1", i.e., when the lock-up inhibition flag is UP, the process proceeds to Step 727. The process proceeds to Step 727 when the answer in Step 742 is NO, i.e., when the present state does not fall within the region for engaging the direct clutch with the third speed gear selected, the process proceeds to Step 727. Step 704 is transfer shifting process for conducting shifting control of the sub transmission 50.

An explanation will be made hereinunder as to the transfer shifting process 800 with specific reference to FIGS. 8 and 9.

Figure 8:
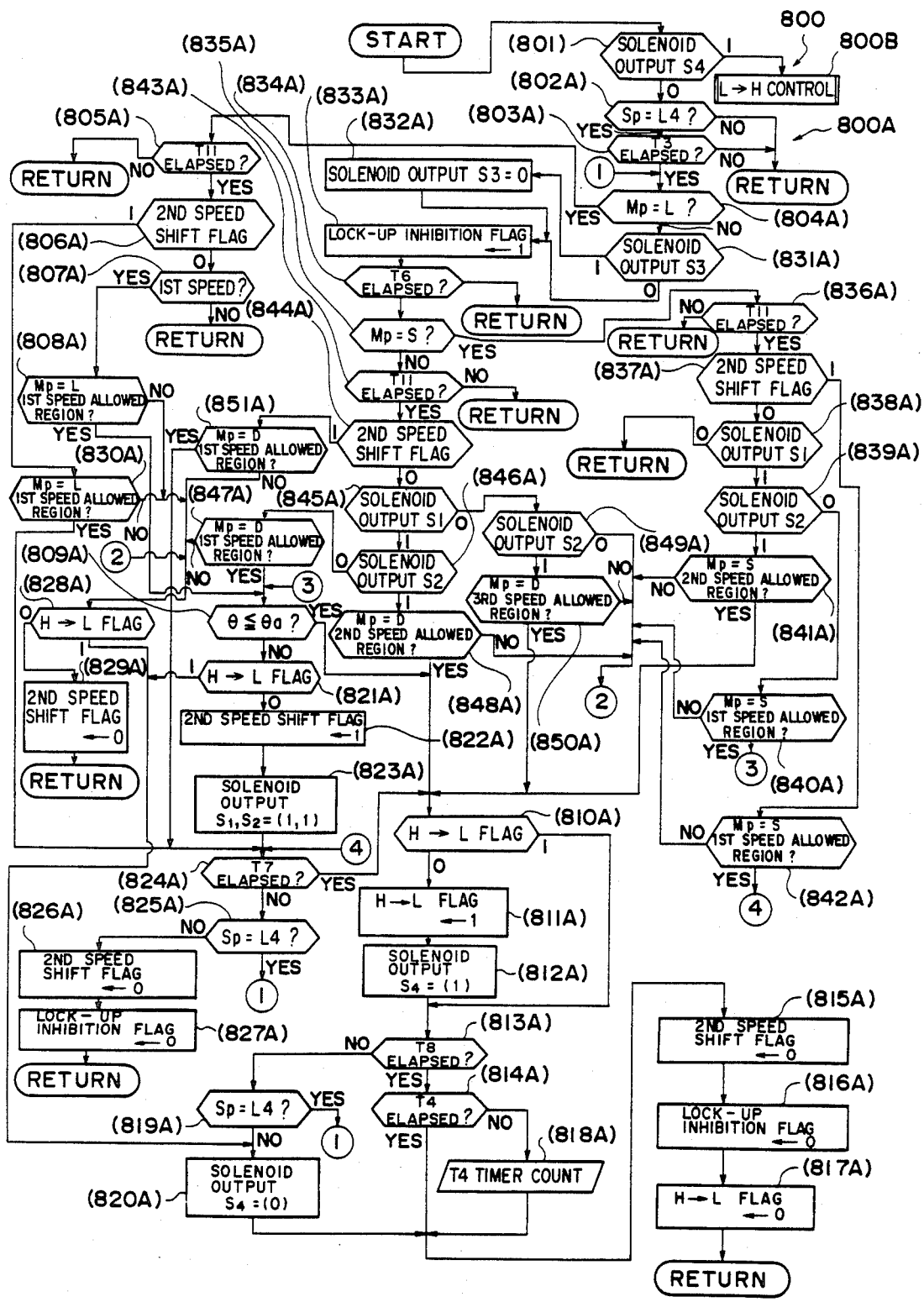
FIGS. 8 and 9 are flow charts of a transfer shifting process.

FIG. 8 is a flow chart showing the transfer shifting process, i.e., the process for changing-over the sub transmission from the direct-coupling drive mode to the reduced-speed drive mode.

In Step 801, a judgement is made as to whether the state of the output to the solenoid valve S4 is "1" (energized) or "0" (de-energized). When the state of the output is "1", i.e., when the solenoid valve S4 is energized, the sub transmission 50 is judged to be in the reduced-speed drive mode, so that the process proceeds to Step 808B for L to H shifting control for changing the state of the sub transmission 50 from the reduced-speed drive mode to the direct-coupling drive mode. However, when the state of the output to the solenoid valve S4 is "0", the sub transmission 50 is judged to be in the direct coupling mode, and the process proceeds to Step 800A for H to L shift control for changing over the sub transmission 50 from the direct-coupling drive mode to the reduced-speed coupling mode. In Step 802A, a judgement is made as to whether the shift position Sp of the sub transmission 50 has been set for the L4 range. If the answer is NO, i.e., if the shift position Sp has not been set for the L4 range, the process returns, whereas, an answer YES in Step 802A shows that the sub transmission has been set for the L4 range: namely, it is judged that the driver has shifted the sub transmission 50 from direct-coupling drive mode to the reduced-speed drive mode. Then, the process proceeds to Step 803A in which a judgement is made as to lapse of a time T3 which has been set beforehand as the time required for the main transmission 10 to complete a shifting operation, i.e., the time length from the moment at which the shifting operation is commenced till the moment at which the same is finished. If the answer is NO, i.e., if the set time T3 has not elapsed from the moment of start of the shifting operation, it is judged that the main transmission 10 is in the course of the shifting, the process returns. However, if the answer in Step 803A is YES, i.e., if the time T3 has elapsed from the moment at which the main transmission 10 started the shifting operation, it is judged that the shifting operation in the main transmission 10 has been finished, so that the process proceeds to Step 804A in which a judgement is made as to whether the shift position Mp has been set for the L range. If the answer is YES, i.e., if the shift position Mp has been set for the L range, a judgement is done in Step 805A as to lapse of a time T11 which has been set beforehand as the time length from the moment at which the shift position Mp is changed till the moment at which the shifting operation is finished. If the answer is NO, i.e., if the set time T11 has not elapsed, the process returns, whereas, if YES, a judgement is made in Step 806A as to the state of the second speed shift flag, i.e., whether the second speed shift flag is "0" (DOWN) or "1" (UP). When the answer is "0", i.e., when the second speed shift flag is DOWN, a judgement is made in Step 807A as to whether the first speed gear is selected by the main transmission 10, i.e., whether the outputs to solenoid valves S1 and S2 are "1" and "0", respectively. When the answer is NO, i.e., when the first speed gear is not selected by the main transmission 10, the process returns but, when the answer is YES, i.e., when the first speed gear is selected by the main transmission 10, a judgement is made in Step 808A as to whether the present state falls within the region shown by hatched area (a) in FIG. 10 for allowing the solenoid valve S4 to be energized under such a vehicle running state shown in FIG. 10 that the shift position Mp is in the L range while the main transmission 10 selects first speed gear. If the answer is YES, i.e., if the present state falls within the region which allows the solenoid valve S4 to be energized, a judgement is made in Step 809A as to whether the throttle opening $\theta$ is below a predetermined set opening $\theta a$. If the answer is YES, i.e., if the throttle opening $\theta$ is below $\theta a$, a judgement is made in Step 810A as to the state of a high to low (H to L) shift flag, i.e., whenther the state of the H to L shift flag is "0" (DOWN) or "1" (UP). If the answer is "0" (DOWN), the state of this flag is changed in Step 811A to "1". Subsequently, an output is produced in Step 812A for energizing the solenoid valve S4 and a judgement is conducted in Step 813A as to lapse of a time T8 which is set beforehand as the time length from the moment at which the solenoid valve S4 is energized till the moment at which the spool 441 of the inhibitor valve 440 actually starts to move. If the answer is YES, i.e., if the time T8 has elapsed, a judgement is conducted in Step 814A as to lapse of a time T4 which has been beforehand set as the time in which the shifting operation in the main transmission 10 is inhibited. If the answer is YES, i.e., when the time T4 has elapsed, the state of a second speed shift flag is changed to "0" in Step 815A, while the state of a lock-up inhibition flag is changed to "0" in a step 816A. Then, the process returns after changing the state of the H to L shift flag to "0" in Step 817A. In the case where the answer in Step 814A is NO, i.e., when the set time T4 has not elapsed, the outputs of the solenoid valves S1 and S2 are maintained (Step 818A) for inhibiting the shifting operation of the main transmission 10 until the set time T4 elapses. When the answer in Step 813A is NO, i.e., when the set time T8 has not elapsed, a judgement is made in Step 819A as to whether the shift position Sp for the sub transmission 50 has been set for the L4 range. If the answer is YES, i.e., if the shift position Sp has been set for the L4 range, the process proceeds to Step 804A. However, when the answer in Step 819A is NO, i.e., when the shift position Sp has not been set for the L4 range, the computer 600 produces in Step 820A an output for de-energizing the solenoid valve S4, and the proces proceeds to Step 815A. When the answer in Step 810A is "1", i.e., when the H to L flag is "UP", the process proceeds to Step 813A. When the answer in Step 809A is NO, i.e., when the throttle opening $\theta$ exceeds $\theta a$, a judgement is conducted in Step 821A as to whether the state of the H to L shift flag is "0" or "1". When the answer is "0" (DOWN), the computer changes the state of the second speed shift flag to "1" in Step 822A, and produces the output for energizing the solenoid valves S1 and S2, thereby effecting an up-shift from the first speed gear to the second speed gear, in Step 823A. Then, in Step 824A, a judgement is made as to lapse of a time T7 which is beforehand set as the time required for the up-shift in the main transmission 10 due to increase of the throttle opening $\theta$ beyond $\theta a$, i.e., the time length from the moment at which the outputs to solenoids S1, S2 are changed to 1,1 till the moment at which the up-shift is completed. If the answer is YES, i.e., when the set time T7 has been elapsed, the process proceeds to Step 810A, whereas, when the answer is NO, i.e., when the set time T7 has not elapsed, a judgement is made in Step 825A as to whether the shift position Sp of the sub transmission 50 has been set for the L4 range. If the answer is YES, i.e., if the shift position Sp has been set for the L4 range, the process proceeds to Step 804A, whereas, if NO, the state of the second speed shift flag is changed to "0" in Step 826A, while changing the state of the lock-up inhibition flag to "0" in Step 827A, and then the process returns. When the answer in Step 812A is "1", i.e., when the H to L shift flag is UP, the process proceeds to Step 820A. Then, when the answer in Step 808A is NO, i.e., when the present state does not fall within the region for allowing the solenoid valve S4 to be energized, the H to L shift flag conducts a judgement in Step 828A as to whether the state of the H to L shift flag is "0" or "1". When the answer is "0", i.e., when the H to L shift flag is DOWN, the computer operates to change the state of the second speed shift flag to "0" and returns the process. However, if the answer in Step 828A is "1", the process proceeds to Step 820A. When the answer in Step 806A is "1", i.e., when the second speed shift flag is UP, a judgement is made in Step 830A as to whether the present state falls within the region shown by hatched area (a) in FIG. 10 for allowing the solenoid valve S4 to be energized under such a running state shown in FIG. 10 that the shift position Mp selects the L range while the main transmission 10 selects the first speed. If the answer is YES, i.e., if the present state falls within the region for allowing the solenoid valve S4 to be energized, the process proceeds to Step 824A, whereas, if the answer is NO, i.e., if the present state does not fall within the region for allowing the solenoid valve S4 to be energized, the process proceeds to Step 828A. In the case where the answer in Step 804A is NO, i.e., when the shift position Mp has not been set for the L range, a judgement is made as to whether the output delivered to the solenoid valve S3 for controlling the lock-up of the main transmission 10 is "1" or "0", i.e., whether the output is for energizing or de-energizing the solenoid valve S3. If the answer is "1", i.e., if the solenoid valve S3 has been energized, the computer operates to de-energize the solenoid valve S3 in Step 832A, whereas, when the answer in Step 831A is "0", i.e., if the solenoid valve S3 has not been energized, the computer operates to change the state of the lock-up inhibition flag to "1" in Step 833A.

Figure 12:
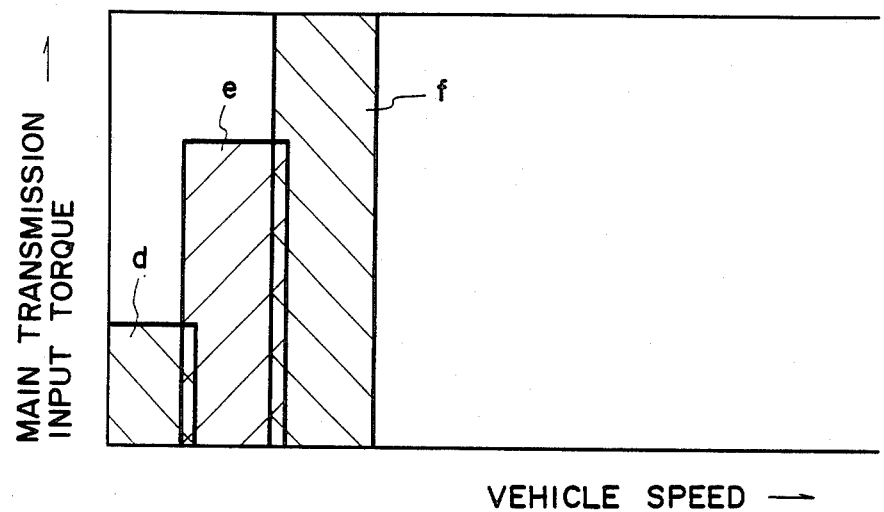

Subsequently, a judgement is made in Step 834A as to lapse of a time T6 which has been beforehand set as the time length from the moment at which the solenoid valve S3 is turned off till the moment at which the direct clutch 16 is released. If the answer is NO, i.e., if the set time T6 has elapsed, the process returns, whereas, if the answer is YES, i.e., if the time T6 has elapsed, a judgement is conducted in Step 835A as to whether the shift position Mp of the main transmission has been set for the S range. If the answer is YES, i.e., if the shift position Mp has been set for the S range, a judgement is conducted in Step 836A as to lapse of a time T11 from the moment of the range shift in the main transmission 10. If NO is the answer, i.e., if the time T11 has not elapsed, the process returns, whereas, if the answer is YES, i.e., if the set time T11 has elapsed, a judgement is conducted in Step 837A as to whether the state of the second speed shift flag is "0" or "1". If the answer is "0", i.e., when the second speed shift flag is DOWN, a judgement is conducted in Step 838A as to whether the state of output to the solenoid valve S1 is "1" (energize) or "0" (non-energize). If the answer is "0", i.e., if the solenoid valve S1 is not energized, the computer judges that the third speed gear is selected and returns the process. However, if the answer is "1", i.e., if the solenoid valve S1 is in the energized state, a judgement is conducted in Step 839A as to whether the output to the solenoid valve S2 is "1" (energize) or "0" (de-energize). If "0", i.e., if the solenoid valve S2 is not energized, the computer judges that the main transmission 10 selects the first speed gear, and a judgement is conducted in Step 840A as to whether the present state falls within the region shown by hatched area (b) in FIG. 11 for allowing the solenoid valve S4 to be energized under such a running state shown in FIG. 11 that the shift position Mp is set for S range while the main transmission selects the first speed gear. If the answer is YES, i.e., if the present state falls within the region for allowing the solenoid valve S4 to be energized, the process proceeds to 809A and, when the answer in Step 840A is NO, i.e., when the present state does not falls within the region for allowing the solenoid valve S4 to be energized, the process proceeds to Step 828A. When the answer in Step 839A is YES, i.e., when the solenoid valve S2 is in the energized state, the computer judges that the second speed gear is selected by the main transmission 10. Then, a judgement is conducted in Step 841A as to whether the present state falls within the region shown by hatched area (c) in FIG. 11 for allowing the solenoid valve S4 to be energized in such a running state shown in FIG. 11 that the shift position Mp is set for the S range while the main transmission 10 selects the second speed gear 10. If the answer is YES, i.e., if the present state falls within the region for allowing the solenoid valve S4 to be energized, the process proceeds to 810A, whereas, if the answer is NO, i.e., if the present state does not fall within the region for allowing the solenoid valve S4 to be energized, the process proceeds to Step 828A. When the answer in Step 837A is "1", i.e., when the second speed shift flag is UP, a judgement is conducted in Step 842A as to whether the present state falls within the region shown by hatched area (b) in FIG. 11 for allowing the solenoid valve S4 to be energized in such a running state shown in FIG. 11 that the shift position Mp has been set for the S range while the main transmission 10 selects the first speed gear. If the answer is YES, i.e., if the present state falls within the region for allowing the solenoid valve S4 to be energized, the process proceeds to Step 824A, whereas, when the answer is NO, i.e., when the present state does not fall within the region for allowing the solenoid S4 to be energized, the process proceeds to Step 828A. When the answer in Step 835A is NO, i.e., when the shift position Mp has not been set for the S range, a judgement is conducted in Step 843A as to whether the set time T11 has elapsed from the range shift operation of the main transmission 10. If the answer is NO, i.e., if the set time T11 has not elapsed, the process returns, whereas, if the answer is YES, i.e., if the set time T11 has elapsed, a judgement is conducted in Step 844A as to whether the state of the second speed shift flag is "0" or "1". If the answer is "0", i.e., if the second speed shift flag is DOWN, a judgement is conducted in Step 845A as to whether the state of the output to the solenoid valve S1 is "1" (energize) or "0" (de-energize). If the answer is "1", i.e., if the solenoid valve S1 is in the energized state, a judgement is conducted in Step 846A as to whether the state of the output to solenoid valve S2 is "1" (energize) or "0" (de-energize). If the answer is "0", i.e., if the solenoid valve S2 is not in the energized state, the computer judges that the first speed gear is selected by the main transmission 10, and conducts in Step 847A as to whether the present state falls within the region shown by hatched area (d) in FIG. 12 for allowing the solenoid valve S4 to be energized in such a runing condition shown in FIG. 12 that the shift position Mp is set for the D range while the main transmission 10 selects the first speed gear. If the answer is YES, i.e., if the present state falls within the region for allowing the solenoid valve S4 to be energized, the process proceeds to Step 809A, whereas, when the answer in Step 847A is NO, i.e., when the present state does not fall within the range for alowing the solenoid valve S4 to be energized, the process proceeds to Step 828A. When the answer in Step 846A is "1", i.e., when the solenoid valve S2 is in the energized state, the computer judges that the main transmission 10 selects the second speed gear, and a judgement is conducted in Step 848A as to whether the present state falls within the region shown by hatched area (e) in FIG. 12 for allowing the solenoid valve S4 to be energized under such a running state shown in FIG. 12 that the shift position Mp is set for the D range while the main transmission 10 selects the second speed gear. If the answer is YES, i.e., if the present state falls within the region for allowing the solenoid valve S4 to be energized, the process proceeds to Step 810A, whereas, when the answer is NO, i.e., if the present state does not fall within the region for allowing the solenoid valve S4 to be de-energized, the process proceeds to Step 828A. On the other hand, when the answer in Step 845A is "0", i.e., when the solenoid valve S1 is not in the energized state, a judgement is conducted in Step 849A as to whether the state of the output to the solenoid valve S2 is "1" (energize) or "0" (de-energize). If the answer is "1", i.e., if the solenoid valve S2 is not in the energized state, the computer judges that the main transmission 10 selects the third speed gear, and a judgement is conducted in Step 850A as to whether the present state falls within the region shown by hatched area (f) in FIG. 12 for allowing the solenoid valve S4 to be energized, in such a running condition shown in FIG. 12 that the shift position Mp has been set for the D range while the main transmission 10 selects the third speed gear. If the answer is YES, i.e., if the present state falls within the region for allowing the solenoid valve S4 to be energized, the process proceeds to Step 810A, whereas, when the answer is NO, i.e., when the present state does not fall within the region for allowing the solenoid valve S4 to be energized, the process proceeds to Step 828A. When the answer in Step 849A is "0", i.e., when the solenoid valve S2 is not in the energized state, the computer judges that the main transmission 10 selects the fourth speed gear, and the process proceeds to Step 828A. When the answer in Step 844A is "1", i.e., when the second speed shift flag is UP, a judgement is conducted in Step 851A as to whether the present state falls within the region shown by hatched area (d) for allowing the solenoid valve S4 to be energized in such a running state shown in FIG. 10 that the shift position Mp is set for the D range while the main transmission 10 selects the first speed gear. If the answer is YES, i.e., if the present state falls within the region for allowing the solenoid valve S4 to be energized, the process proceeds to Step 824A, whereas, if not, the process proceeds to Step 828A.

Figure 9:
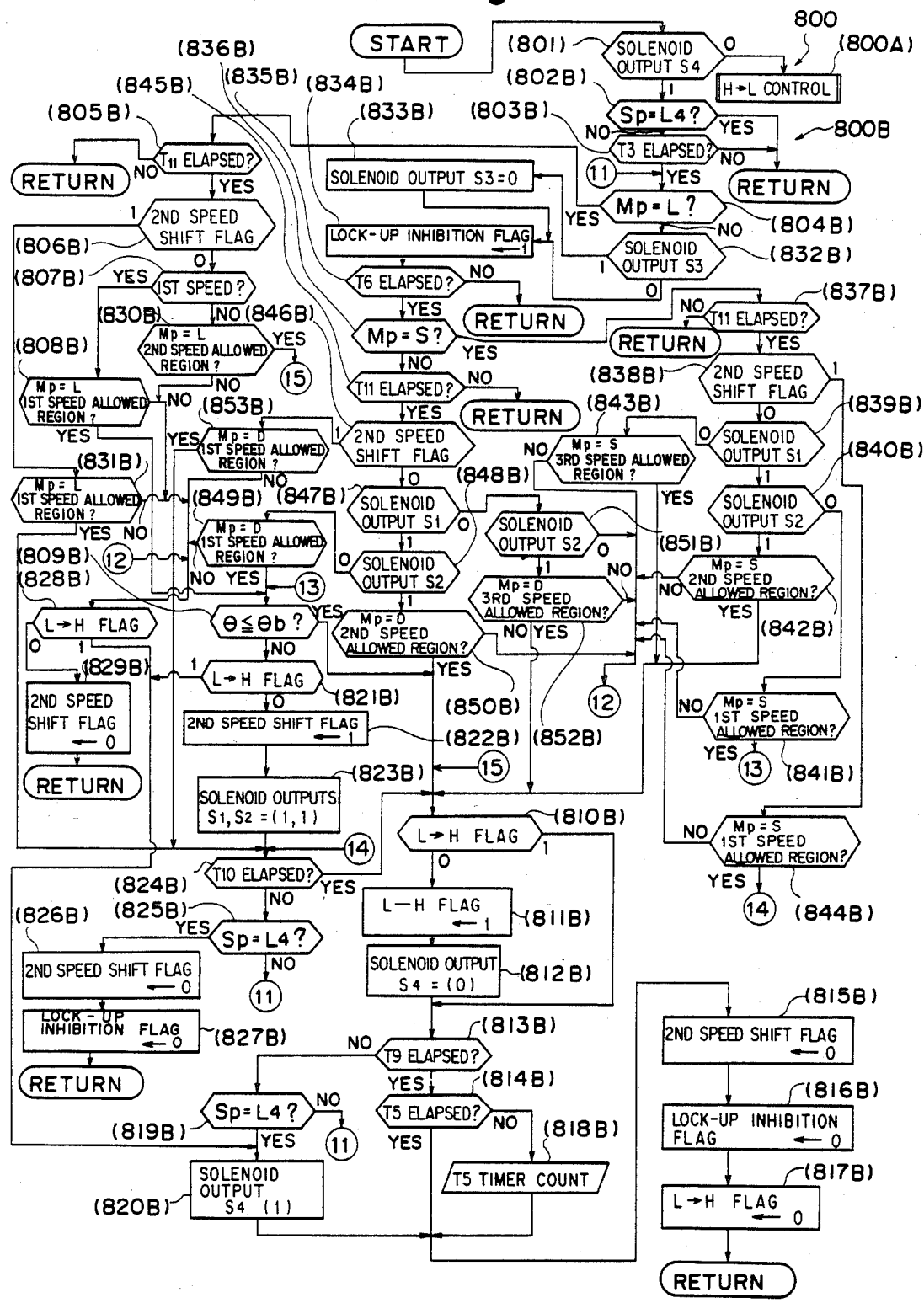
Figure 10:
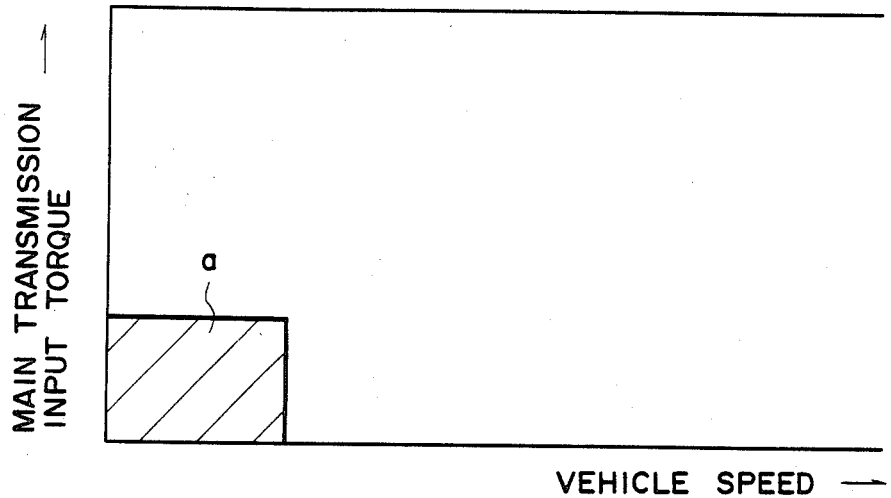
FIGS. 10 to 15 are graphs showing shifting allowable regions in the first embodiment.
Figure 11:
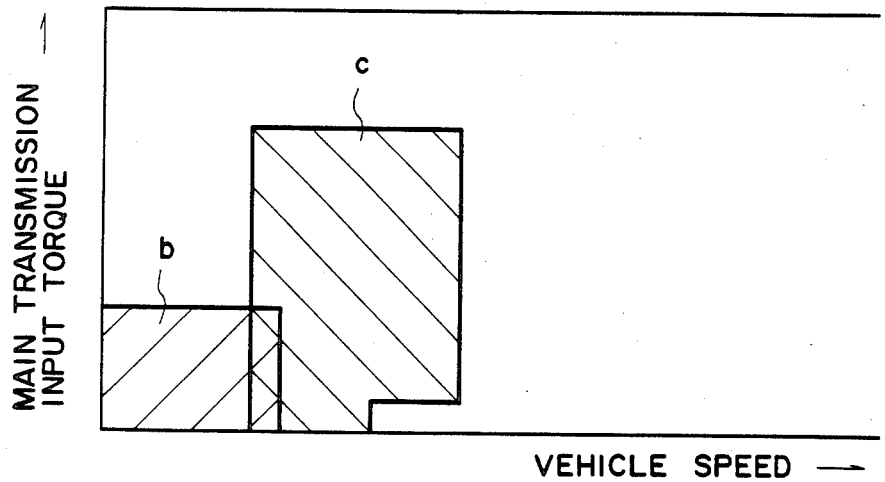

FIG. 9 is a flow chart showing the transfer shifting process 800, i.e., the process for changing-over the sub transmission 50 from the reduced-speed drive mode to the direct-coupling drive mode.

Figure 13:
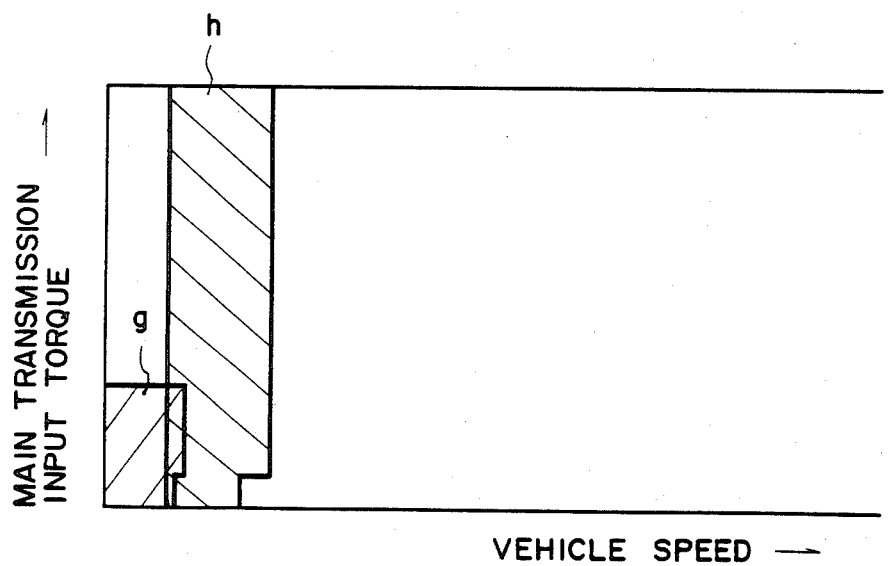

In Step 801, a judgement is made as to whether the state of the output to the solenoid valve S4 is "1" (energized) or "0" (de-energized). When the state of the output is "0", i.e., when the solenoid valve S4 is de-energized, the sub transmission 50 is judged to be in the direct-coupling drive mode, so that the process proceeds to Step 808A for conducting H to L shifting control for changing the state of the sub transmission 50 from the direct-coupling drive mode to the reduced-speed drive mode. However, when the state of the output to the solenoid valve S4 is "1", the sub transmission 50 is judged to be in the reduced-speed drive mode, and the process proceeds to Step 800B for conducting a shift control for changing over the sub transmission 50 from the reduced-speed drive mode to the direct-coupling drive mode (L to H). In Step 802B, a judgement is made as to whether the shift position Sp of the sub transmission 50 has been set for the L4 range. If the answer is YES, i.e., if the shift position Sp has been set for the L4 range, the process returns, whereas, an answer NO in Step 802B shows that the sub transmission 50 has not been set for the L4 range: namely, it is judged that the driver has shifted the sub transmission 50 from reduced-speed drive mode to the direct-coupling drive mode. Then, the process proceeds to Step 803B in which a judgement is made as to lapse of a time T3 which has been set beforehand as the time required for the main transmission 10 to complete a shifting operation, i.e., the time length from the moment at which the shifting operation is commenced till the moment at which the same is finished. If the answer is NO, i.e., if the set time T3 has not elapsed from the moment of start of the shifting operation, it is judged that the main transmission 10 is in the course of the shifting, the process returns. However, if the answer in Step 803B is YES, i.e., if the time T3 has elapsed from the moment at which the main transmission 10 started the shifting operation, it is judged that the shifting operation in the main transmission 10 has been finished, so that the process proceeds to Step 804B in which a judgement is made as to whether the shift position Mp has been set for the L range. If the answer is YES, i.e., if the shift position Mp has been set for the L range, a judgement is done in Step 805B as to lapse of a time T11 which has been set beforehand as the time length from the moment at which the shift position Mp is changed till the moment at which the shifting operation is finished. If the answer is NO, i.e., if the set time T11 has not elapsed, the process returns, whereas, if YES, a judgement is made in Step 806B as to the state of the second speed shift flag, i.e., whether the state of the second speed shift flag is "0" (DOWN) or "1" (UP). When the answer is "0", i.e., when the second speed shift flag is DOWN, a judgement is made in Step 807B as to whether the first speed gear is selected by the main transmission 10, i.e., whether the outputs to slenoid valves S1 and S2 are "1" and "0", respectively. When the first speed gear has been selected by the main transmission 10, a judgement is made in Step 808B as to whether the present state falls within the region shown by hatched area (g) in FIG. 13 for allowing the solenoid valve S4 to be de-energized under such a vehicle running state shown in FIG. 13 that the shift position Mp is in the L range while the main transmission 10 selects first speed gear. If the answer is YES, i.e., if the present state falls within the region which allows the solenoid valve S4 to be de-energized, a judgement is made in Step 809B as to whether the throttle opening $\theta$ is below a predetermined set opening $\theta$b. If the answer is YES, i.e., if the throttle opening $\theta$ is below $\theta$b, a judgement is made in Step 810B as to the state of a low to high (L to H) shift flag, i.e., whenther the state of the L to H shift flag is "0" (DOWN) or "1" (UP). If the answer is "0" (DOWN), the state of this flag is changed in Step 811B to "1". Subsequently, an output is produced in Step 812B for de-energizing the solenoid valve S4 and a judgement is conducted in Step 813B as to lapse of a time T8 which is set beforehand as the time length from the moment at which the solenoid valve S4 is enetgized till the moment at which the spool 441 of the inhibitor valve 440 actually starts to move. If the answer is YES, i.e., if the time T8 has elapsed, a judgement is conducted in Step 814B as to lapse of a time T5 which has been beforehand set as the time over which the shifting operation in the main transmission 10 is inhibited. If the answer is YES, i.e., when the time T5 has elapsed, the state of a second speed shift flag is changed to "0" in Step 815B, while the state of a lock-up inhibition flag is changed to "0" in a step 816B. Then, the process returns after changing the state of the L to H shift flag to "0" in Step 817B. In the case where the answer in Step 814B is NO, i.e., when the set time T5 has not elapsed, the outputs of the solenoid valves S1 and S2 are maintained (Step 818B) for inhibiting the shifting operation of the main transmission 10 until the set time T5 elapses. When the answer in Step 813B is NO, i.e., when the set time T9 has not elapsed, a judgement is made in Step 819B as to whether the shift position Sp for the sub transmission 50 has been set for the L4 range. If the answer is NO, i.e., if the shift position Sp has not been set for the L4 range, the process proceeds to 804B. However, when the answer in Step 819B is YES, i.e., when the shift position Sp has been set for the L4 range, the computer 600 produces in Step 820B an output for energizing the solenoid valve S4, and the proces proceeds to Step 815B. However, when the answer in Step 810B is "1", i.e., when the L to H flag is UP, the process proceeds to Step 813B. When the answer in Step 809B is NO, i.e., when the throttle opening $\theta$ has exceeded $\theta$b, a judgement is conducted in Step 821B as to whether the state of the L to H shift flag is "0" or "1". When the answer is "0" (DOWN), the computer changes the state of the second speed shift flag to "1" in Step 822B, and produces the output for energizing the solenoid valves S1 and S2, thereby effecting an up-shift from the first speed gear to the second speed gear, in Step 823B. Then, in Step 824B, a judgement is made as to lapse of a time T10 which is beforehand set as the time required for the up-shift in the main transmission 10 due to increase of the throttle opening $\theta$ beyond $\theta$b, i.e., the time length from the moment at which the outputs to solenoids S1, S2 are changed to 1,1 till the moment at which the up-shift is completed. If the answer is YES, i.e., when the set time T10 has been elapsed, the process proceeds to Step 810B, whereas, when the answer is NO, i.e., when the set time T10 has not elapsed, a judgement is made in Step 825B as to whether the shift position Sp of the sub transmission 50 has been set for the L4 range. If the answer is NO, i.e.,if the shift position has not been set for the L4 range, the process proceeds to Step 804B. If the answer is YES, i.e., if the shift position Sp has been set for the L4 range, the state of the second speed shift flag is changed to "0" in Step 826B, while changing the state of the lock-up inhibition flag to "0" in Step 827B, and then the process returns. When the answer in Step 812B is "1", i.e., when the L to H shift flag is UP, the process proceeds to Step 820B. Then, when the answer in Step 808B is NO, i.e., when the present state does not fall within te region for allowing the solenoid valve S4 to be de-energized, a judgement in Step 828B as to whether the state of the L to H shift flag is "0" or "1". When the answer is "0", i.e., when the L to H shift flag is DOWN, the computer operates to change the state of the second speed shift flag to "0" in Step 829B and returns the process. However, if the answer in Step 828B is "1", the process proceeds to Step 820B. When the answer in Step 807B is NO, i.e., if the main transmission 10 does not select the first speed gear, the computer judges that the main transmission 10 selects the second speed gear, and a judgement is made in Step 830B as to whether the present state falls within the region shown by hatched area (h) in FIG. 3 for allowing the solenoid valve S4 to be de-energized under such a running state shown in FIG. 13 that the shift position Mp selects the L range. If the answer is YES, i.e., if the present state falls within the region for allowing the solenoid valve S4 to be de-energized, the process proceeds to Step 810B, whereas, if the answer is NO, i.e., if the present state does not fall within the region for allowing the solenoid valve S4 to be de-energized, the process proceeds to Step 828B. If the answer in Step 806B is "1", i.e., when the second speed shift flag is UP, a judgement is conducted in Step 831B as to whether the present state falls within the region shown by hatched area (g) in FIG. 13 for allowing the solenoid valve S4 to be de-energized under such a running state shown in FIG. 13 that the shift position Mp has been set for the L range while the main transmission 10 selects the first speed gear. If the answer is YES, i.e., if the present state falls within the region for allowing the solenoid valve S4 to be de-energized, the process proceeds to Step 824B, whereas, if NO, i.e., if the present state falls within the region for allowing the solenoid valve S4 to be de-energized, the process proceeds to Step 828B. In the case where the answer in Step 804B is NO, i.e., when the shift position Mp has not been set for the L range, a judgement is made in Step 832B as to whether the output delivered to the solenoid valve S3 for controlling the lock-up of the main transmission 10 is "1" or "0", i.e., whether the output is for energizing or de-energizing the solenoid valve S3. If the answer is "1", i.e., if the solenoid valve S3 has been energized, the computer operates to de-energize the solenoid valve S3 in Step 832B, whereas, when the answer in Step 831B is "0", i.e., if the solenoid valve S3 has not been de-energized, the computer operates to change the state of the lock-up inhibition flag to "1" in Step 834B.

Figure 14:
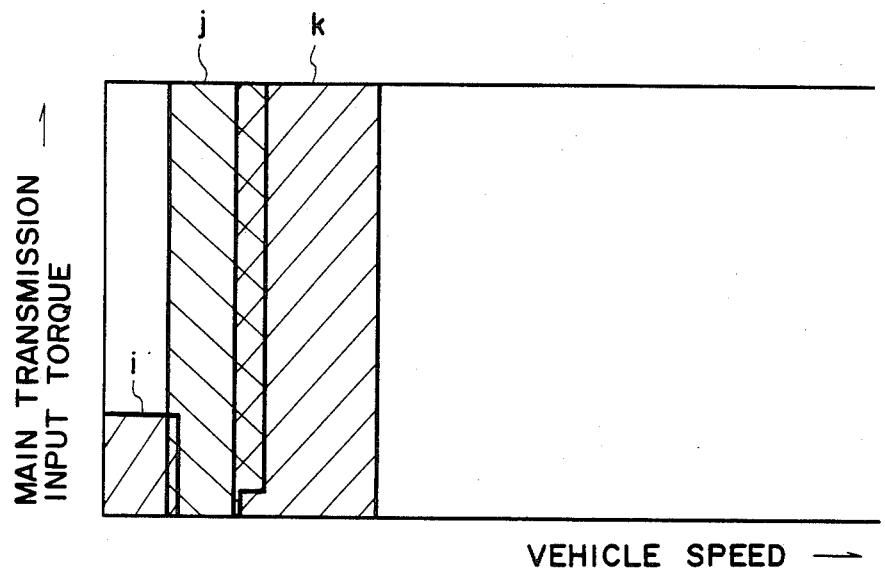
Figure 15:
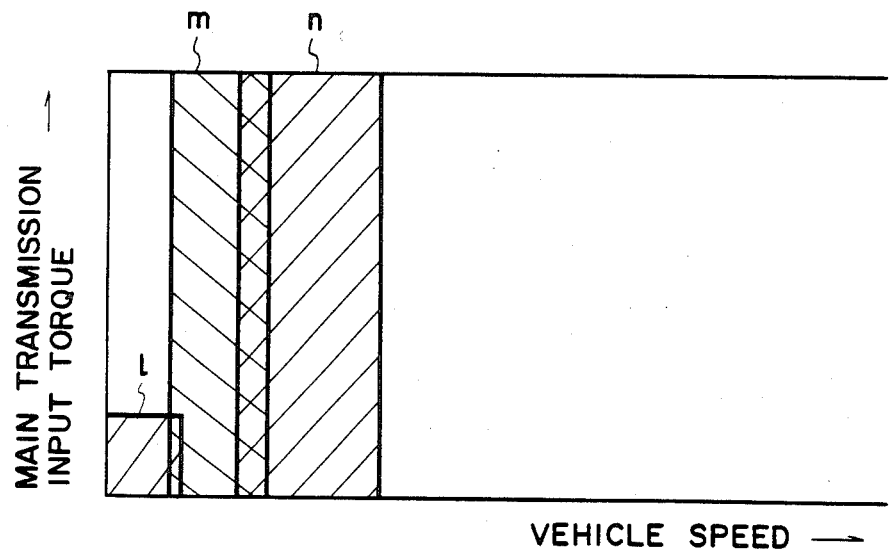

Subsequently, a judgement is made in Step 835B as to lapse of the time T6 which has been beforehand set as the time length from the moment at which the solenoid valve S3 is turned off till the moment at which the direct clutch 16 is released. If the answer is NO, i.e., if the set time T6 has not elapsed, the process returns, whereas, if the answer is YES, i.e., if the time T6 has elapsed, a judgement is conducted in Step 836B as to whether the shift position Mp of the main transmission has been set for the S range. If the answer is YES, i.e., if the shift position Mp has been set for the S range, a judgement is conducted in Step 837B as to lapse of a time T11 from the moment of the range shift in the main transmission 10. If NO is the answer, i.e., if the time T11 has not elapsed, the process returns, whereas, if the answer is YES, i.e., if the set time T11 has elapsed, a judgement is conducted in Step 838B as to whether the state of the second speed shift flag is "0" or "1". If the answer is "0", i.e., when the second speed shift flag is DOWN, a judgement is conducted in Step 839B as to whether the state of output to the solenoid valve S1 is "1" (energize) or "0" (de-energize). If the answer is "1", i.e., if the solenoid valve S1 is in the energized state, a judgement is conducted in Step 840B as to whether the output to the solenoid valve S2 is "1" (energize) or "0" (de-energize). If "0", i.e., if the solenoid valve S2 is not energized, the computer judges that the main transmission 10 selects the first speed gear, and a judgement is conducted in Step 841B as to whether the present state falls within the region shown by hatched area (i) in FIG. 14 for allowing the solenoid valve S4 to be de-energized under such a running state shown in FIG. 14 that the shift position Mp is set for S range while the main transmission selects the first speed gear. If the answer is YES, i.e., if the present state falls within the region for allowing the solenoid valve S4 to be de-energized, the process proceeds to 809B and, when the answer in Step 841B is NO, i.e., when the present state does not falls within the region for allowing the solenoid valve S4 to be de-energized, the process proceeds to Step 828B. When the answer in Step 840B is YES, i.e., when the solenoid valve S2 is in the energized state, the computer judges that the second speed gear is selected by the main transmission 10. Then, a judgement is conducted in Step 842B as to whether the present state falls within the region shown by hatched area (j) in FIG. 11 for allowing the solenoid valve S4 to be de-energized in such a running state shown in FIG. 14 that the shift position Mp is set for the S range while the main transmission 10 selects the second speed gear 10. If the answer is YES, i.e.,if the present state falls within the region for allowing the solenoid valve S4 to be de-energized, the process proceeds to 810B, whereas, if the answer is NO, i.e., if the present state does not fall within the region for allowing the solenoid valve S4 to be de-energized, the process proceeds to Step 828B. When the answer in Step 839B is "0", i.e., when the solenoid valve S1 is not energized, the computer judges that the main transmission selects the third speed gear, and a judgement is conducted in Step 843B as to whether the present state falls within the region shown by hatched area "k" for allowing the solenoid valve S4 to be de-energized, under such running condition shown in FIG. 14 that the shift position Mp falls within the S range while the main transmission selects the third speed gear. When the answer is YES, i.e., when the present state falls within the region for allowing the solenoid valve S4 to be de-energized, the process proceeds to Step 810B, whereas, when the answer is NO, i.e., when the solenoid valve S4 does not fall within the range for de-energizing the solenoid valve S4, the process proceeds to Step 828B. When the answer in Step 837B is "1", i.e., when the second speed shift flag is UP, a judgement is conducted in Step 844B as to whether the present state falls within the region shown by hatched area "i" in FIG. 14 for allowing the solenoid valve S4 to be de-energized under such a running condition shown in FIG. 14 that the shift position Mp has in the S range while the main transmission 10 selects the first speed gear. If the answer is YES, i.e., if the present state falls within the region for allowing the solenoid valve S4 to be de-energized, the process proceeds to Step 824B, whereas, when the answer is NO, i.e., when the present state does not fall within the region for allowing the solenoid valve S4 to be de-energized, the process proceeds to Step 828B. When the answer in Step 836B is NO, i.e., when the shift position Mp has not been set for the S range, a judgement is conducted in Step 845B as to whether the set time T11 has elapsed from the range shift operation of the main transmission 10. If the answer is NO, i.e., if the set time T11 has not elapsed, the process returns, whereas, if the answer is YES, i.e., if the set time T11 has elapsed, a judgement is conducted in Step 846B as to whether the state of the second speed shift flag is "0" or "1". If the answer is "0", i.e., if the second speed shift flag is DOWN, a judgement is conducted in Step 847B as to whether the state of the output to the solenoid valve S1 is "1" (energize) or "0" (de-energize). If the answer is "1", i.e., if the solenoid valve S1 is in the energized state, a judgement is conducted in Step 848B as to whether the state of the output to solenoid valve S2 is "1" (energize) or "0" (de-energize). If the answer is "0", i.e., if the solenoid valve S2 is not in the energized state, the computer judges that the first speed gear is selected by the main transmission 10, and conducts in Step 849B a judgement as to whether the present state falls within the region shown by hatched area (1) in FIG. 15 for allowing the solenoid valve S4 to be de-energized in such a runing state shown in FIG. 15 that the shift position Mp is set for the D range while the main transmission 10 selects the first speed gear. If the answer is YES, i.e., if the present state falls within the region for allowing the solenoid valve S4 to be de-energized, the process proceeds to Step 809B, whereas, when the answer in Step 849B is NO, i.e., when the present state does not fall within the range for allowing the solenoid valve S4 to be de-energized, the process proceeds to Step 828B. When the answer in Step 848B is "1", i.e., when the solenoid valve S2 is in the energized state, the computer judges that the main transmission 10 selects the second speed gear, and a judgement is conducted in Step 850B as to whether the present state falls within the region shown by hatched area (m) in FIG. 15 for allowing the solenoid valve S4 to be de-energized under such a running state shown in FIG. 15 that the shift position Mp is set for the D range while the main transmission 10 selects the second speed gear. If the answer is YES, i.e., if the present state falls within the region for allowing the solenod valve S4 to be de-energized, the process proceeds to Step 810B, whereas, when the answer is NO, i.e., if the present state does not fall within the region for allowing the solenoid valve S4 to be de-energized, the process proceeds to Step 828B. On the other hand, when the answer in Step 847B is "0", i.e., when the solenoid valve S1 is not in the energized state, a judgement is conducted in Step 851B as to whether the state of the output to the solenoid valve S2 is "1" (energize) or "0" (de-energize). If the answer is "1", i.e., if the solenoid valve S2 is not in the energized state, the computer judges that the main transmission 10 selects the third speed gear, and a judgement is conducted in Step 852B as to whether the present state falls within the region shown by hatched area (n) in FIG. 15 for allowing the solenoid valve S4 to be de-energized, in such a running condition shown in FIG. 15 that the shift position Mp has been set for the D range while the main transmission 10 selects the third speed gear. If the answer is YES, i.e., if the present state falls within the region for allowing the solenoid valve S4 to be de-energized, the process proceeds to Step 810A, whereas, when the answer is NO, i.e., when the present state does not fall within the region for allowing the solenoid valve S4 to be energized, the process proceeds to Step 828B. When the answer in Step 851B is "0", i.e., when the solenoid valve S2 is not in the energized state, the computer judges that the main transmission 10 selects the fourth speed gear, and the process proceeds to Step 828B. When the answer in Step 846B is "1", i.e., when the second speed shift flag is UP, a judgement is conducted in Step 853B as to whether the present state falls within the region shown by hatched area (d) in FIG. 15 for allowing the solenoid valve S4 to be de-energized in such a running condition shown in FIG. 15 that the shift position Mp is set for the D range while the main transmission 10 selects the first speed gear. If the answer is YES, i.e., if the present state falls within the region for allowing the solenoid valve S4 to be de-energized, the process proceeds to Step 824B, whereas, if not, the process proceeds to Step 828B.

FIGS. 16 to 23 show a second embodiment of the transmission control device in accordance with the present invention.

Figure 16:
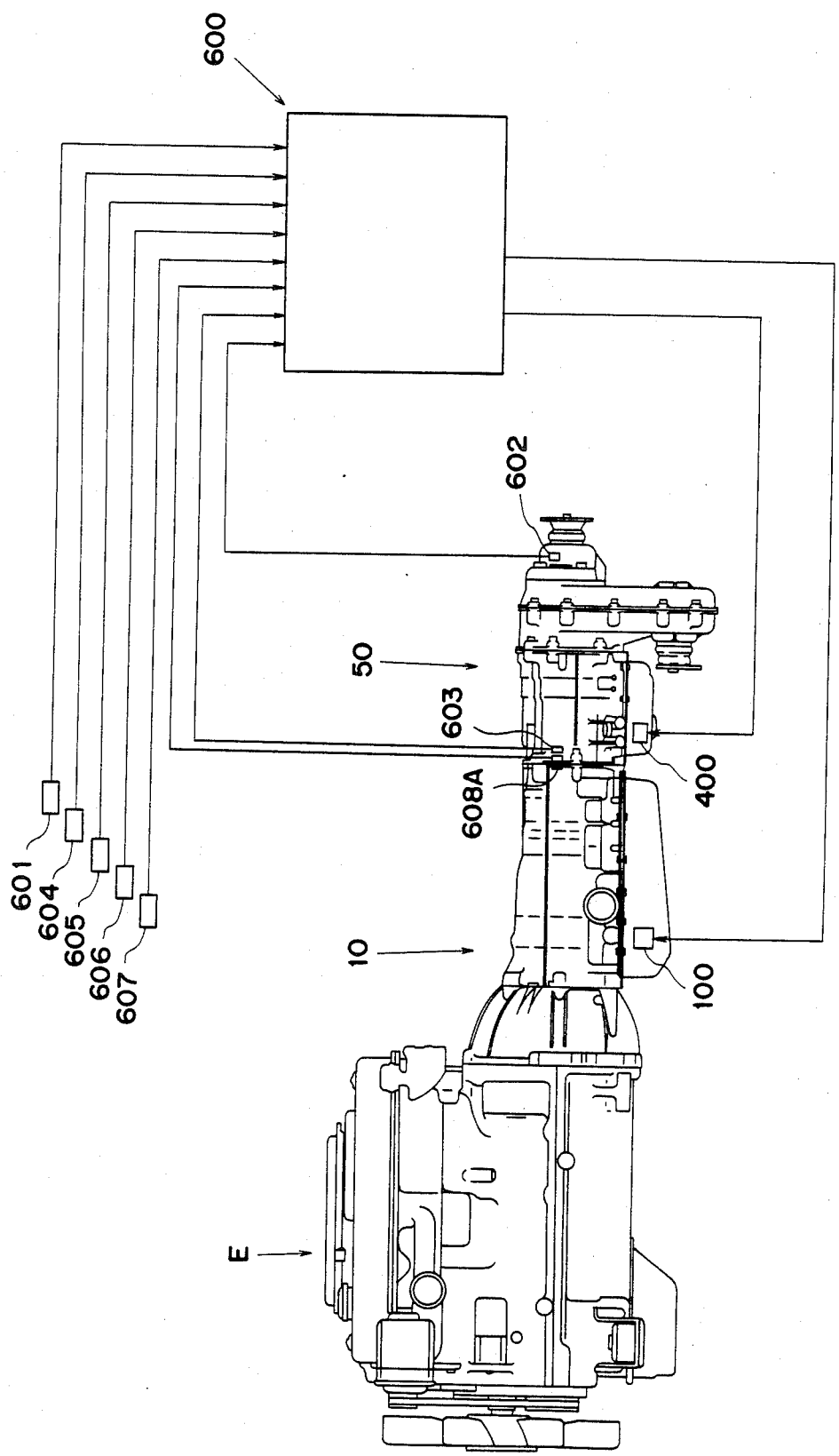
FIGS. 16 and 17 are block diagrams of the electronic control device or computer employed in a second embodiment of the invention.
Figure 17:
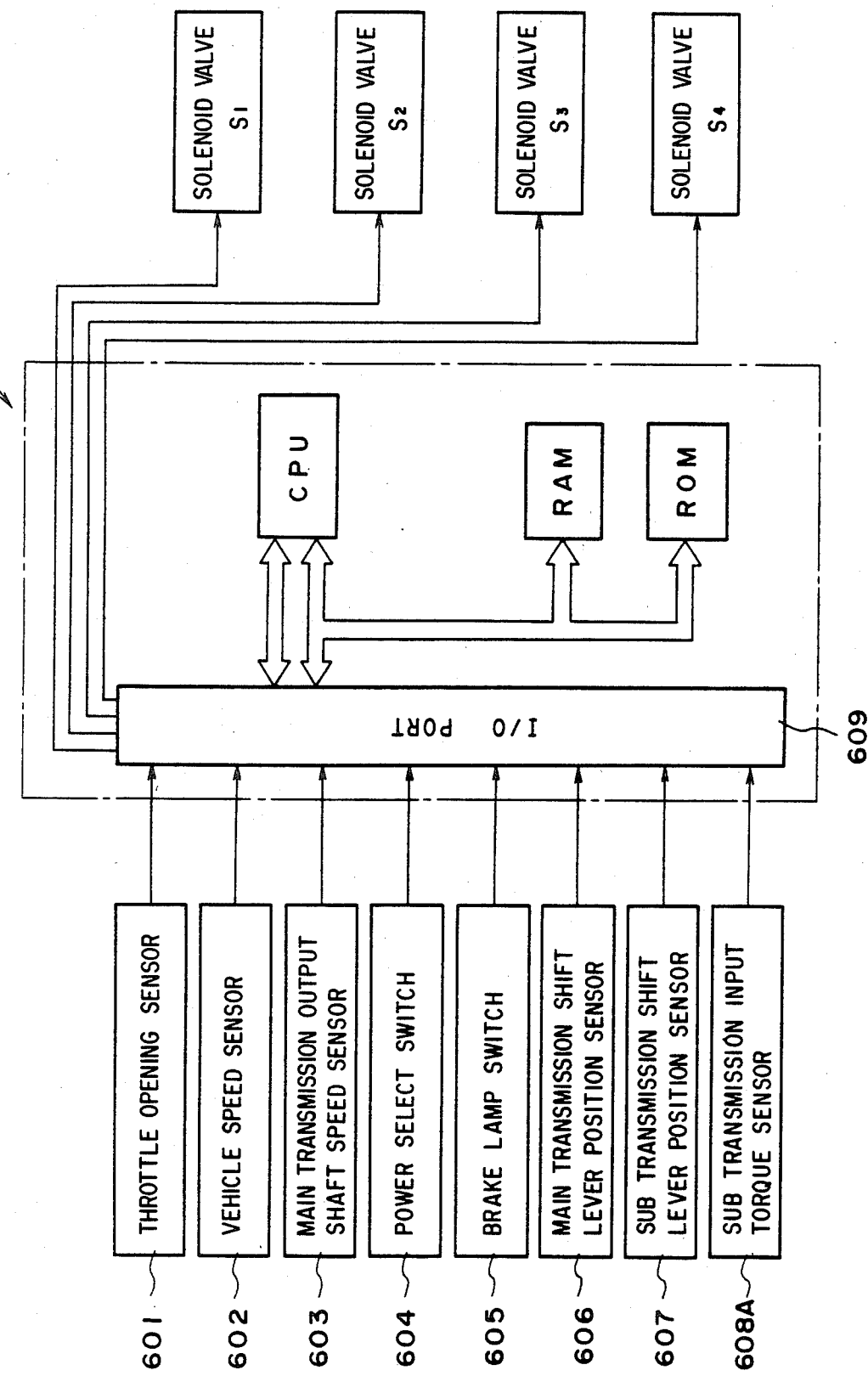
Figure 18:
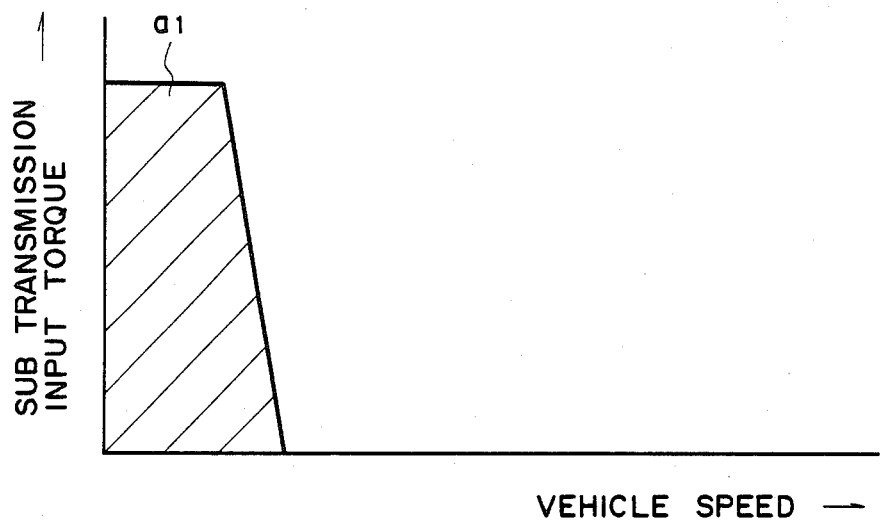
FIGS. 18 to 23 are graphs showing shifting allowable regions in the second embodiment.
Figure 19:
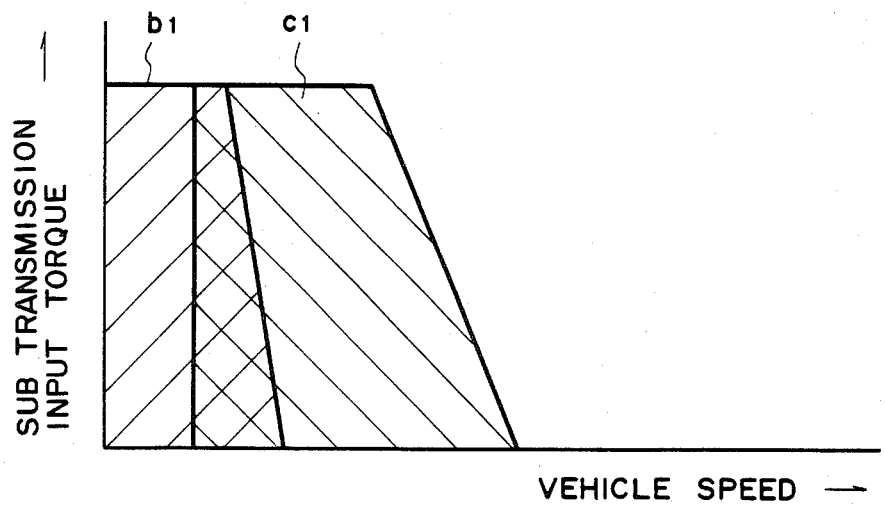
Figure 20:
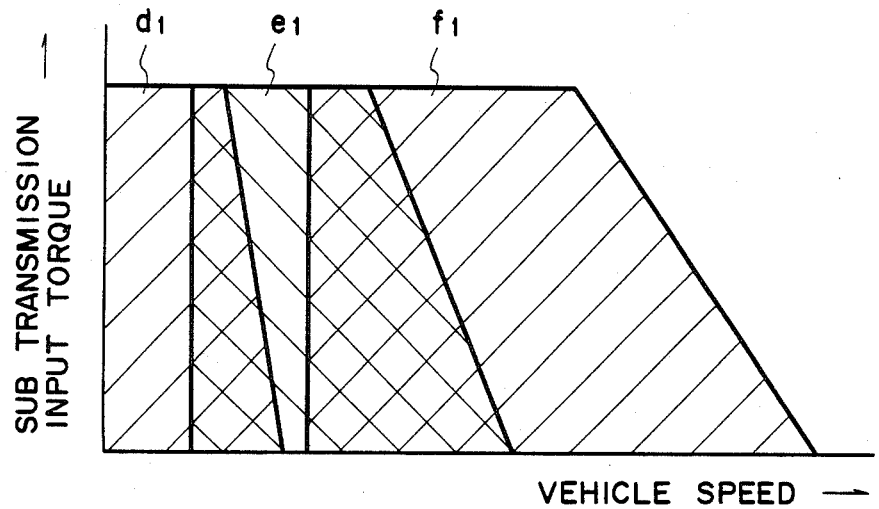
Figure 21:
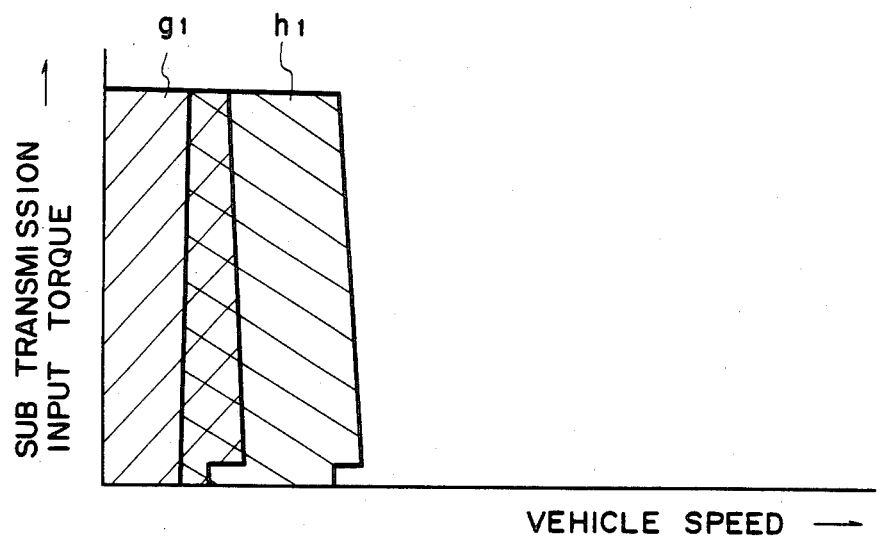
Figure 22:
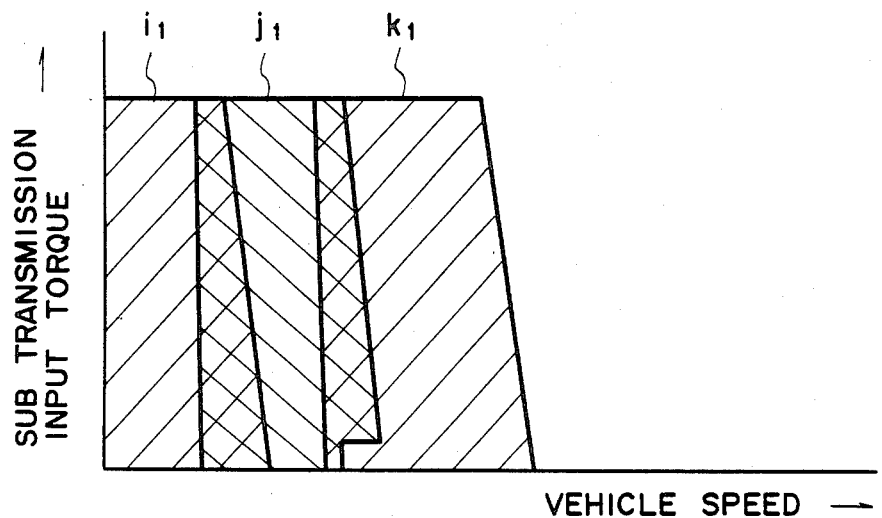
Figure 23:
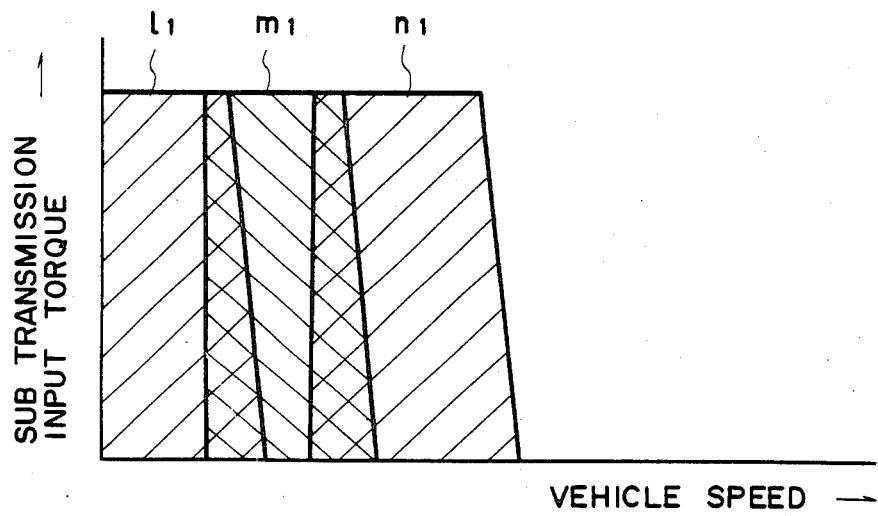

Referring first to FIGS. 16 and 17 which are block diagrams of the computer incorporated in the second embodiment, the transmission control device of the second embodiment employs, in place of the engine output torque sensor 608 used in the first embodiment, a sub transmission input torque sensor 608A for sensing the torque of the output shaft 32 of the main transmission 10, i.e., torque inputted to the sub transmission 50. The operation of the second embodiment will be described with reference to FIGS. 8 and 9 illustrating the transfer shifting process of the preceding embodiment.

In Step 801, a judgement is made as to whether the state of the output to the solenoid valve S4 is "1" (energized) or "0" (de-energized). When the state of the output is "1", i.e., when the solenoid valve S4 is energized, the sub transmission 50 is judged to be in the reduced-speed drive mode, so that the process proceeds to Step 808B for L to H shifting control for changing the state of the sub transmission 50 from the reduced-speed drive mode to the direct-coupling drive mode. However, when the state of the output to the solenoid valve S4 is "0", the sub transmission 50 is judged to be in the direct coupling mode, and the process proceeds to Step 800A for H to L shift control for changing over the sub transmission 50 from the direct-coupling drive mode to the reduced-speed coupling mode. In Step 802A, a judgement is made as to whether the shift position Sp of the sub transmission 50 has been set for the L4 range. If the answer is NO, i.e., if the shift position Sp has not been set for the L4 range, the process returns, whereas, an answer YES in Step 802A shows that the sub transmission has been set for the L4 range: namely, it is judged that the driver has shifted the sub transmission 50 from direct-coupling drive mode to the reduced-speed drive mode. Then, the process proceeds to Step 803A in which a judgement is made as to lapse of a time T3 which has been set beforehand as the time required for the main transmission 10 to complete a shifting operation, i.e., the time length from the moment at which the shifting operation is commenced till the moment at which the same is finished. If the answer is NO, i.e., if the set time T3 has not elapsed from the moment of start of the shifting operation, it is judged that the main transmission 10 is in the course of the shifting, the process returns. However, if the answer in Step 803A is YES, i.e., if the time T3 has elapsed from the moment at which the main transmission 10 started the shifting operation, it is judged that the shifting operation in the main transmission 10 has been finished, so that the process proceeds to Step 804A in which a judgement is made as to whether the shift position Mp has been set for the L range. If the answer is YES, i.e., if the shift position Mp has been set for the L range, a judgement is done in Step 805A as to lapse of a time T11 which has been set beforehand as the time length from the moment at which the shift position Mp is changed till the moment at which the shifting operation is finished. If the answer is NO, i.e., if the set time T11 has not elapsed, the process returns, whereas, if YES, a judgement is made in Step 806A as to the state of the second speed shift flag, i.e., whether the second speed shift flag is "0" (DOWN) or "1" (UP). When the answer is "0", i.e., when the second speed shift flag is DOWN, a judgement is made in Step 807A as to whether the first speed gear is selected by the main transmission 10, i.e., whether the outputs to slenoid valves S1 and S2 are "1" and "0", respectively. When the answer is NO, i.e., when the first speed gear is not selected by the main transmission 10, the process returns but, when the answer is YES, i.e., when the first speed gear is selected by the main transmission 10, a judgement is made in Step 808A as to whether the present state falls within the region shown by hatched area (a1) in FIG. 18 for allowing the solenoid valve S4 to be energized under such a vehicle running state shown in FIG. 18 that the shift position Mp is in the L range while the main transmission 10 selects first speed gear. If the answer is YES, i.e., if the present state falls within the region which allows the solenoid valve S4 to be energized, a judgement is made in Step 809A as to whether the throttle opening $\theta$ is below a predetermined set opening $\theta a$. If the answer is YES, i.e., if the throttle opening $\theta$ is below $\theta a$, a judgement is made in Step 810A as to the state of a high to low (H to L) shift flag, i.e., whenther the state of the H to L shift flag is "0" (DOWN) or "1" (UP). If the answer is "0" (DOWN), the state of this flag is changed in Step 811A to "1". Subsequently, an output is produced in Step 812A for energizing the solenoid valve S4 and a judgement is conducted in Step 813A as to lapse of a time T8 which is set beforehand as the time length from the moment at which the solenoid valve S4 is enetgized till the moment at which the spool 441 of the inhibitor valve 440 actually starts to move. If the answer is YES, i.e., if the time T8 has elapsed, a judgement is conducted in Step 814A as to lapse of a time T4 which has been beforehand set as the time in which the shifting operation in the main transmission 10 is inhibited. If the answer is YES, i.e., when the time T4 has elapsed, the state of a second speed shift flag is changed to "0" in Step 815A, while the state of a lock-up inhibition flag is changed to "0" in a step 816A. Then, the process returns after changing the state of the H to L shift flag to "0" in Step 817A. In the case where the answer in Step 814A is NO, i.e., when the set time T4 has not elapsed, the outputs of the solenoid valves S1 and S2 are maintained (Step 818A) for inhibiting the shifting operation in the main transmission 10 until the set time T4 elapses. When the answer in Step 813A is NO, i.e., when the set time T8 has not elapsed, a judgement is made in Step 819A as to whether the shift position Sp for the sub transmission 50 has been set for the L4 range. If the answer is YES, i.e., if the shift position Sp has been set for the L4 range, the process proceeds to Step 804A. However, when the answer in Step 819A is NO, i.e., when the shift position Sp has not been set for the L4 range, the computer 600 produces in Step 820A an output for de-energizing the solenoid valve S4, and the proces proceeds to Step 815A. When the answer in Step 810A is "1", i.e., when the H to L flag is "UP", the process proceeds to Step 813A. When the answer in Step 809A is NO, i.e., when the throttle opening $\theta$ exceeds $\theta a$, a judgement is conducted in Step 821A as to whether the state of the H to L shift flag is "0" or "1". When the answer is "0" (DOWN), the computer changes the state of the second speed shift flag to "1" in Step 822A, and produces the output for energizing the solenoid valves S1 and S2, thereby effecting an up-shift from the first speed gear to the second speed gear, in Step 823A. Then, in Step 824A, a judgement is made as to lapse of a time T7 which is beforehand set as the time required for the up-shift in the main transmission 10 due to increase of the throttle opening $\theta$ beyond $\theta a$, i.e., the time length from the moment at which the outputs to solenoids S1, S2 are changed to 1,1 till the moment at which the up-shift is completed. If the answer is YES, i.e., when the set time T7 has been elapsed, the process proceeds to Step 810A, whereas, when the answer is NO, i.e., when the set time T7 has not elapsed, a judgement is made in Step 825A as to whether the shift position Sp of the sub transmission 50 has been set for the L4 range. If the answer is YES, i.e., if the shift position Sp has set for the L4 range, the process proceeds to Step 804A, whereas, if NO, the state of the second speed shift flag is changed to "0" in Step 826A, while changing the state of the lock-up inhibition flag to "0" in Step 827A, and then the process returns. When the answer in Step 812A is "1", i.e., when the H to L shift flag is UP, the process proceeds to Step 820A. Then, when the answer in Step 808A is NO, i.e., when the present state does not fall within te region for allowing the solenoid valve S4 to be energized, the H to L shift flag conducts a judgement in Step 828A as to whether the state of the H to L shift flag is "0" or "1". When the answer is "0", i.e., when the H to L shift flag is DOWN, the computer operates to change the state of the second speed shift flag to "0" and returns the process. However, if the answer in Step 828A is "1", the process proceeds to Step 820A. When the answer in Step 806A is "1", i.e., when the second speed shift flag is UP, a judgement is made in Step 830A as to whether the present state falls within the region shown by hatched area (a1) in FIG. 18 for allowing the solenoid valve S4 to be energized under such a running state shown in FIG. 18 that the shift position Mp selects the L range while the main transmission 10 selects the first speed. If the answer is YES, i.e., if the present state falls within the region for allowing the solenoid valve S4 to be energized, the process proceeds to Step 824A, whereas, if the answer is NO, i.e., if the present state does not fall within the region for allowing the solenoid valve S4 to be energized, the process proceeds to Step 828A. In the case where the answer in Step 804A is NO, i.e., when the shift position Mp has not been set for the L range, a judgement is made as to whether the output delivered to the solenoid valve S3 for controlling the lock-up of the main transmission 10 is "1" or "0", i.e., whether the output is for energizing or de-energizing the solenoid valve S3. If the answer is "1", i.e., if the solenoid valve S3 has been energized, the computer operates to de-energize the solenoid valve S3 in Step 832A, whereas, when the answer in Step 831A is "0", i.e., if the solenoid valve S3 has not been energized, the computer operates to change the state of the lock-up inhibition flag to "1" in Step 833A.

Subsequently, a judgement is made in Step 834A as to lapse of a time T6 which has been beforehand set as the time length from the moment at which the solenoid valve S3 is turned off till the moment at which the direct clutch 16 is released. If the answer is NO, i.e., if the set time T6 has elapsed, the process returns, whereas, if the answer is YES, i.e., if the time T6 has elapsed, a judgement is conducted in Step 835A as to whether the shift position Mp of the main transmission has been set for the S range. If the answer is YES, i.e., if the shift position Mp has been set for the S range, a judgement is conducted in Step 836A as to lapse of a time T11 from the moment of the range shift in the main transmission 10. If NO is the answer, i.e., if the time T11 has not elapsed, the process returns, whereas, if the answer is YES, i.e., if the set time T11 has elapsed, a judgement is conducted in Step 837A as to whether the state of the second speed shift flag is "0" or "1". If the answer is "0", i.e., when the second speed shift flag is DOWN, a judgement is conducted in Step 838A as to whether the state of output to the solenoid valve S1 is "1" (energize) or "0" (non-energize). If the answer is "0", i.e., if the soneoid valve S1 is not energized, the computer judges that the third speed gear is selected and returns the process. However, if the answer is "1", i.e., if the solenoid valve S1 is in the energized state, a judgement is conducted in Step 839A as to whether the output to the solenoid valve S2 is "1" (energize) or "0" (de-energize). If "0", i.e., if the solenoid valve S2 is not energized, the computer judges that the main transmission 10 selects the first speed gear, and a judgement is conducted in Step 840A as to whether the present state falls within the region shown by hatched area (b1) in FIG. 19 for allowing the solenoid valve S4 to be energized under such a running state shown in FIG. 19 that the shift position Mp is set for S range while the main transmission selects the first speed gear. If the answer is YES, i.e., if the present state falls within the region for allowing the solenoid valve S4 to be energized, the process proceeds to 809A and, when the answer in Step 840A is NO, i.e., when the present state does not falls within the region for allowing the solenoid valve S4 to be energized, the process proceeds to Step 828A. When the answer in Step 839A is YES, i.e., when the solenoid valve S2 is in the energized state, the computer judges that the second speed gear is selected by the main transmission 10. Then, a judgement is conducted in Step 841A as to whether the present state falls within the region shown by hatched area (c1) in FIG. 19 for allowing the solenoid valve S4 to be energized in such a running state shown in FIG. 19 that the shift position Mp is set for the S range while the main transmission 10 selects the second speed gear 10. If the answer is YES, i.e., if the present state falls within the region for allowing the solenoid valve S4 to be energized, the process proceeds to 810A, whereas, if the answer is NO, i.e., if the present state does not fall within the region for allowing the solenoid valve S4 to be energized, the process proceeds to Step 828A. When the answer in Step 837A is "1", i.e., when the second speed shift flag is UP, a judgement is conducted in Step 842A as to whether the present state falls within the region shown by hatched area (b1) in FIG. 19 for allowing the solenoid valve S4 to be energized under such a condition shown in FIG. 19 that the shift position Mp has been set for the S range while the main transmission selects the first speed gear. If the answer is YES, i.e., if the present state falls within the region for allowing the solenoid valve S4 to be energized, the process proceeds to Step 824A, whereas, if NO, i.e., if the present state does not fall within the region for allowing the solenoid valve S4 to be energized, the process proceeds to Step 828A. When the answer in Step 835A is NO, i.e., when the shift position Mp has not been set for the S range, a judgement is conducted in Step 843A as to whether the set time T11 has elapsed from the range shift operation of the main transmission 10. If the answer is NO, i.e., if the set time T11 has not elapsed, the process returns, whereas, if the answer is YES, i.e., if the set time T11 has elapsed, a judgement is conducted in Step 844A as to whether the state of the second speed shift flag is "0" or "1". If the answer is "0", i.e., if the second speed shift flag is DOWN, a judgement is conducted in Step 845A as to whether the state of the output to the solenoid valve S1 is "1" (energize) or "0" (de-energize). If the answer is "1", i.e., if the solenoid valve S1 is in the energized state, a judgement is conducted in Step 846A as to whether the state of the output to solenoid valve S2 is "1" (energize) or "0" (de-energize). If the answer is "0", i.e., if the solenoid valve S2 is not in the energized state, the computer judges that the first speed gear is selected by the main transmission 10, and conducts in Step 847A as to whether the present state falls within the region shown by hatched area (d1) in FIG. 20 for allowing the solenoid valve S4 to be energized in such a runing condition shown in FIG. 20 that the shift position Mp is set for the D range while the main transmission 10 selects the first speed gear. If the answer is YES, i.e., if the present state falls within the region for allowing the solenoid valve S4 to be energized, the process proceeds to Step 809A, whereas, when the answer in Step 847A is NO, i.e., when the present state does not fall within the range for alowing the solenoid valve S4 to be energized, the process proceeds to Step 828A. When the answer in Step 846A is "1", i.e., when the solenoid valve S2 is in the energized state, the computer judges that the main transmission 10 selects the second speed gear, and a judgement is conducted in Step 848A as to whether the present state falls within the region shown by hatched area (e) in FIG. 20 for allowing the solenoid valve S4 to be energized under such a running state shown in FIG. 20 that the shift position Mp is set for the D range while the main transmission 10 selects the second speed gear. If the answer is YES, i.e., if the present state falls within the region for allowing the solenod valve S4 to be energized, the process proceeds to Step 810A, whereas, when the answer is NO, i.e., if the present state does not fall within the region for allowing the solenoid valve S4 to be de-energized, the process proceeds to Step 828A. On the other hand, when the answer in Step 845A is "0", i.e., when the solenoid valve S1 is not in the energized state, a judgement is conducted in Step 849A as to whether the state of the output to the solenoid valve S2 is "1" (energize) or "0" (de-energize). If the answer is "1", i.e., if the solenoid valve S2 is not in the energized state, the computer judges that the main transmission 10 selects the third speed gear, and a judgement is conducted in Step 850A as to whether the present state falls within the region shown by hatched area (f1) in FIG. 20 for allowing the solenoid valve S4 to be energized, in such a running condition shown in FIG. 12 that the shift position Mp has been set for the D range while the main transmission 10 selects the third speed gear. If the answer is YES, i.e., if the present state falls within the region for allowing the solenoid valve S4 to be energized, the process proceeds to Step 810A, whereas, when the answer is NO, i.e., when the present state does not fall within the region for allowing the solenoid valve S4 to be energized, the process proceeds to Step 828A. When the answer in Step 849A is "0", i.e., when the solenoid valve S2 is not in the energized state, the computer judges that the main transmission 10 selects the fourth speed gear, and the process proceeds to Step 828A. When the answer in Step 844A is "1", i.e., when the second speed shift flag is UP, a judgement is conducted in Step 851A as to whether the present state falls within the region shown by hatched area (dl) for allowing the solenoid valve S4 to be energized in such a running state shown in FIG. 20 that the shift position Mp is set for the D range while the main transmission 10 selects the first speed gear. If the answer is YES, i.e., if the present state falls within the region for allowing the solenoid valve S4 to be energized, the process proceeds to Step 824A, whereas, if not, the process proceeds to Step 828A.

FIG. 9 is a flow chart showing the transfer shifting process 800, i.e., the process for changing-over the sub transmission 50 from the reduced-speed drive mode to the direct-coupling drive mode.

In Step 801, a judgement is made as to whether the state of the output to the solenoid valve S4 is "1" (energized) or "0" (de-energized). When the state of the output is "0", i.e., when the solenoid valve S4 is de-energized, the sub transmission 50 is judged to be in the direct-coupling drive mode, so that the process proceeds to Step 808A for conducting H to L shifting control for changing the state of the sub transmission 50 from the direct-coupling drive mode to the reduced-speed drive mode. However, when the state of the output to the solenoid valve S4 is "1", the sub transmission 50 is judged to be in the reduced-speed drive mode, and the process proceeds to Step 800B for conducting a shift control for changing over the sub transmission 50 from the reduced-speed drive mode to the direct-coupling drive mode (L to H). In Step 802B, a judgement is made as to whether the shift position Sp of the sub transmission 50 has been set for the L4 range. If the answer is YES, i.e., if the shift position Sp has been set for the L4 range, the process returns, whereas, an answer NO in Step 802B shows that the sub transmission 50 has not been set for the L4 range: namely, it is judged that the driver has shifted the sub transmission 50 from reduced-speed drive mode to the direct-coupling drive mode. Then, the process proceeds to Step 803B in which a judgement is made as to lapse of a time T3 which has been set beforehand as the time required for the main transmission 10 to complete a shifting operation, i.e., the time length from the moment at which the shifting operation is commenced till the moment at which the same is finished. If the answer is NO, i.e., if the set time T3 has not elapsed from the moment of start of the shifting operation, it is judged that the main transmission 10 is in the course of the shifting, the process returns. However, if the answer in Step 803B is YES, i.e., if the time T3 has elapsed from the moment at which the main transmission 10 started the shifting operation, it is judged that the shifting operation in the main transmission 10 has been finished, so that the process proceeds to Step 804B in which a judgement is made as to whether the shift position Mp has been set for the L range. If the answer is YES, i.e., if the shift position Mp has been set for the L range, a judgement is done in Step 805B as to lapse of a time T11 which has been set beforehand as the time length from the moment at which the shift position Mp is changed till the moment at which the shifting operation is finished. If the answer is NO, i.e., if the set time T11 has not elapsed, the process returns, whereas, if YES, a judgement is made in Step 806B as to the state of the second speed shift flag, i.e., whether the state of the second speed shift flag is "0" (DOWN) or "1" (UP). When the answer is "0", i.e., when the second speed shift flag is DOWN, a judgement is made in Step 807B as to whether the first speed gear is selected by the main transmission 10, i.e., whether the outputs to slenoid valves S1 and S2 are "1" and "0", respectively. When the answer is YES, i.e., when the first speed gear has been selected by the main transmission 10, a judgement is made in Step 808B as to whether the present state falls within the region shown by hatched area (gl) in FIG. 21 for allowing the solenoid valve S4 to be de-energized under such a vehicle running state shown in FIG. 21 that the shift position Mp is in the L range while the main transmission 10 selects first speed gear. If the answer is YES, i.e., if the present state falls within the region which allows the solenoid valve S4 to be de-energized, a judgement is made in Step 809B as to whether the throttle opening $\theta$ is below a predetermined set opening $\theta b$. If the answer is YES, i.e., if the throttle opening $\theta$ is below $\theta b$, a judgement is made in Step 810B as to the state of a low to high (L to H) shift flag, i.e., whenther the state of the L to H shift flag is "0" (DOWN) or "1" (UP). If the answer is "0" (DOWN), the state of this flag is changed in Step 811B to "1". Subsequently, an output is produced in Step 812B for de-energizing the solenoid valve S4 and a judgement is conducted in Step 813B as to lapse of a time T8 which is set beforehand as the time length from the moment at which the solenoid valve S4 is de-energized till the moment at which the spool 441 of the inhibitor valve 440 actually starts to move. If the answer is YES, i.e., if the time T8 has elapsed, a judgement is conducted in Step 814B as to lapse of a time T5 which has been beforehand set as the time over which the shifting operation in the main transmission 10 is inhibited. If the answer is YES, i.e., when the time T5 has elapsed, the state of a second speed shift flag is changed to "0" in Step 815B, while the state of a lock-up inhibition flag is changed to "0" in a step 816B. Then, the process returns after changing the state of the L to H shift flag to "0" in Step 817B. In the case where the answer in Step 814B is NO, i.e., when the set time T5 has not elapsed, the outputs of the solenoid valves S1 and S2 are maintained (Step 818B) for inhibiting the shifting operation of the main transmission 10 until the set time T5 elapses. When the answer in Step 813B is NO, i.e., when the set time T9 has not elapsed, a judgement is made in Step 819B as to whether the shift position Sp for the sub transmission 50 has been set for the L4 range. If the answer is NO, i.e., if the shift position Sp has not been set for the L4 range, the process proceeds to 804B. However, when the answer in Step 819B is YES, i.e., when the shift position Sp has been set for the L4 range, the computer 600 produces in Step 820B an output for energizing the solenoid valve S4, and the proces proceeds to Step 815B. However, when the answer in Step 810B is "1", i.e., when the L to H flag is UP, the process proceeds to Step 813B. When the answer in Step 809B is NO, i.e., when the throttle opening $\theta$ exceeds $\theta a$, a judgement is conducted in Step 821B as to whether the state of the L to H shift flag is "0" or "1". When the answer is "0" (DOWN), the computer changes the state of the second speed shift flag to "1" in Step 822B, and produces the output for energizing the solenoid valves S1 and S2, thereby effecting an up-shift from the first speed gear to the second speed gear, in Step 823B. Then, in Step 824B, a judgement is made as to lapse of a time T10 which is beforehand set as the time required for the up-shift in the main transmission 10 due to increase of the throttle opening $\theta$ beyond $\theta$b, i.e., the time length from the moment at which the outputs to solenoids S1, S2 are changed to 1,1 till the moment at which the up-shift is completed. If the answer is YES, i.e., when the set time T10 has been elapsed, the process proceeds to Step 810B, whereas, when the answer is NO, i.e., when the set time T10 has not elapsed, a judgement is made in Step 825B as to whether the shift position Sp of the sub transmission 50 has been set for the L4 range. If the answer is NO, i.e., if the shift position has not been set for the L4 range, the process proceeds to Step 804B. If the answer is YES, i.e., if the shift position Sp has been set for the L4 range, the state of the second speed shift flag is changed to "0" in Step 826B, while changing the state of the lock-up inhibition flag to "0" in Step 827B, and then the process returns. When the answer in Step 812B is "1", i.e., when the L to H shift flag is UP, the process proceeds to Step 820B. Then, when the answer in Step 808B is NO, i.e., when the present state does not fall within te region for allowing the solenoid valve S4 to be de-energized, a judgement is done in Step 828B as to whether the state of the L to H shift flag is "0" or "1". When the answer is "0", i.e., when the L to H shift flag is DOWN, the computer operates to change the state of the second speed shift flag to "0" in Step 829B and returns the process. However, if the answer in Step 828B is "1", the process proceeds to Step 820B. When the answer in Step 807B is NO, i.e., if the main transmission 10 does not select the first speed gear, the computer judges that the main transmission 10 selects the second speed gear, and a judgement is made in Step 830B as to whether the present state falls within the region shown by hatched area (h) in FIG. 21 for allowing the solenoid valve S4 to be de-energized under such a running state shown in FIG. 13 that the shift position Mp selects the L range. If the answer is YES, i.e., if the present state falls within the region for allowing the solenoid valve S4 to be de-energized, the process proceeds to Step 810B, whereas, if the answer is NO, i.e., if the present state does not fall within the region for allowing the solenoid valve S4 to be de-energized, the process proceeds to Step 828B. If the answer in Step 806B is "1", i.e., when the second speed shift flag is UP, a judgement is conducted in Step 831B as to whether the present state falls within the region shown by hatched area (gl) in FIG. 21 for allowing the solenoid valve S4 to be de-energized under such a running state shown in FIG. 21 that the shift position Mp has been set for the L range while the main transmission 10 selects the first speed gear. If the answer is YES, i.e., if the present state falls within the region for allowing the solenoid valve S4 to be de-energized, the process proceeds to Step 824B, whereas, if NO, i.e., if the present state does not fall within the region for allowing the solenoid valve S4 to be de-energized, the process proceeds to Step 828B. In the case where the answer in Step 804B is NO, i.e., when the shift position Mp has not been set for the L range, a judgement is made in Step 832B as to whether the output delivered to the solenoid valve S3 for controlling the lock-up of the main transmission 10 is "1" or "0", i.e., whether the output is for energizing or de-energizing the solenoid valve S3. If the answer is "1", i.e., if the solenoid valve S3 has been energized, the computer operates to de-energize the solenoid valve S3 in Step 833B, whereas, when the answer in Step 832B is "0", i.e., if the solenoid valve S3 has not been de-energized, the computer operates to change the state of the lock-up inhibition flag to "1" in Step 834B.

Subsequently, a judgement is made in Step 835B as to lapse of the time T6 which has been beforehand set as the time length from the moment at which the solenoid valve S3 is turned off till the moment at which the direct clutch 16 is released. If the answer is NO, i.e., if the set time T6 has not elapsed, the process returns, whereas, if the answer is YES, i.e., if the time T6 has elapsed, a judgement is conducted in Step 836B as to whether the shift position Mp of the main transmission has been set for the S range. If the answer is YES, i.e., if the shift position Mp has been set for the S range, a judgement is conducted in Step 837B as to lapse of a time T11 from the moment of the range shift in the main transmission 10. If NO is the answer, i.e., if the time T11 has not elapsed, the process returns, whereas, if the answer is YES, i.e., if the set time T11 has elapsed, a judgement is conducted in Step 838B as to whether the state of the second speed shift flag is "0" or "1". If the answer is "0", i.e., when the second speed shift flag is DOWN, a judgement is conducted in Step 839B as to whether the state of output to the solenoid valve S1 is "1" (energize) or "0" (de-energize). If the answer is "1", i.e., if the solenoid valve S1 is in the energized state, a judgement is conducted in Step 840B as to whether the output to the selenoid valve S2 is "1" (energize) or "0" (de-energize). If "0", i.e., if the solenoid valve S2 is not energized, the computer judges that the main transmission 10 selects the first speed gear, and a judgement is conducted in Step 841B as to whether the present state falls within the region shown by hatched area (il) in FIG. 22 for allowing the solenoid valve S4 to be de-energized under such a running state shown in FIG. 22 that the shift position Mp is set for S range while the main transmission selects the first speed gear. If the answer is YES, i.e., if the present state falls within the region for allowing the solenoid valve S4 to be de-energized, the process proceeds to 809B and, when the answer in Step 841B is NO, i.e., when the present state does not fall within the region for allowing the solenoid valve S4 to be de-energized, the process proceeds to Step 828B. When the answer in Step 840B is YES, i.e., when the solenoid valve S2 is in the energized state, the computer judges that the second speed gear is selected by the main transmission 10. Then, a judgement is conducted in Step 842B as to whether the present state falls within the region shown by hatched area (jl) in FIG. 22 for allowing the solenoid valve S4 to be de-energized in such a running state shown in FIG. 22 that the shift position Mp is set for the S range while the main transmission 10 selects the second speed gear 10. If the answer is YES, i.e., if the present state falls within the region for allowing the solenoid valve S4 to be de-energized, the process proceeds to 810B, whereas, if the answer is NO, i.e., if the present state does not fall within the region for allowing the solenoid valve S4 to be de-energized, the process proceeds to Step 828B. Whenthe answer in Step 839B is "0", i.e., when the solenoid valve S1 is not energized, the computer judges that the main transmission selects the third speed gear, and a judgement is conducted in Step 843B as to whether the present state falls within the region shown by hatched area "k" for allowing the solenoid valve S4 to be de-energized, under such running condition shown in FIG. 14 that the shift position Mp falls within the S range while the main transmission selects the third speed gear. When the answer is YES, i.e., when the present state falls within the region for allowing the solenoid valve S4 to be de-energized, the process proceeds to Step 810B, whereas, when the answer is NO, i.e., when the present state does not fall within the range for de-energizing the solenoid valve S4, the process proceeds to Step 828B. When the answer in Step 837B is "1", i.e., when the second speed shift flag is UP, a judgement is conducted in Step 844B as to whether the present state falls within the region shown by hatched area "il" in FIG. 22 for allowing the solenoid valve S4 to be de-energized under such a running condition shown in FIG. 22 that the shift position Mp has in the S range while the main transmission 10 selects the first speed gear. If the answer is YES, i.e., if the present state falls within the region for allowing the solenoid valve S4 to be de-energized, the process proceeds to Step 824B, whereas, when the answer is NO, i.e., when the present state does not fall within the region for allowing the solenoid valve S4 to be de-energized, the process proceeds to Step 828B. When the answer in Step 836B is NO, i.e., when the shift position Mp has not been set for the S range, a judgement is conducted in Step 845B as to whether the set time T11 has elapsed from the range shift operation of the main transmission 10. If the answer is NO, i.e., if the set time T11 has not elapsed, the process returns, whereas, if the answer is YES, i.e., if the set time T11 has elapsed, a judgement is conducted in Step 846B as to whether the state of the second speed shift flag is "0" or "1". If the answer is "0", i.e., if the second speed shift flag is DOWN, a judgement is conducted in Step 847B as to whether the state of the output to the solenoid valve S1 is "1" (energize) or "0" (de-energize). If the answer is "1", i.e., if the solenoid valve S1 is in the energized state, a judgement is conducted in Step 848B as to whether the state of the output to solenoid valve S2 is "1" (energize) or "0" (de-energize). If the answer is "0", i.e., if the solenoid valve S2 is not in the energized state, the computer judges that the first speed gear is selected by the main transmission 10, and conducts in Step 849B a judgement as to whether the present state falls within the region shown by hatched area (11) in FIG. 23 for allowing the solenoid valve S4 to be de-energized in such a runing state shown in FIG. 23 that the shift position Mp is set for the D range while the main transmission 10 selects the first speed gear. If the answer is YES, i.e., if the present state falls within the region for allowing the solenoid valve S4 to be de-energized, the process proceeds to Step 809B, whereas, when the answer in Step 849B is NO, i.e., when the present state does not fall within the range for allowing the solenoid valve S4 to be de-energized, the process proceeds to Step 828B. When the answer in Step 848B is "1", i.e., when the solenoid valve S2 is in the energized state, the computer judges that the main transmission 10 selects the second speed gear, and a judgement is conducted in Step 850B as to whether the present state falls within the region shown by hatched area (ml) in FIG. 23 for allowing the solenoid valve S4 to be de-energized under such a running state shown in FIG. 23 that the shift position Mp is set for the D range while the main transmission 10 selects the second speed gear. If the answer is YES, i.e., if the present state falls within the region for allowing the solenod valve S4 to be de-energized, the process proceeds to Step 810B, whereas, when the answer is NO, i.e., if the present state does not fall within the region for allowing the solenoid valve S4 to be de-energized, the process proceeds to Step 828B. On the other hand, when the answer in Step 847B is "0", i.e., when the solenoid valve S1 is not in the energized state, a judgement is conducted in Step 851B as to whether the state of the output to the solenoid valve S2 is "1" (energize) or "0" (de-energize). If the answer is "1", i.e., if the solenoid valve S2 is not in the energized state, the computer judges that the main transmission 10 selects the third speed gear, and a judgement is conducted in Step 852B as to whether the present state falls within the region shown by hatched area (nl) in FIG. 23 for allowing the solenoid valve S4 to be de-energized, in such a running condition shown in FIG. 23 that the shift position Mp has been set for the D range while the main transmission 10 selects the third speed gear. If the answer is YES, i.e., if the present state falls within the region for allowing the solenoid valve S4 to be de-energized, the process proceeds to Step 810B, whereas, when the answer is NO, i.e., when the present state does not fall within the region for allowing the solenoid valve S4 to be energized, the process proceeds to Step 828B. When the answer in Step 851B is "0", i.e., when the solenoid valve S2 is not in the energized state, the computer judges that the main transmission 10 selects the fourth speed gear, and the process proceeds to Step 828B. When the answer in Step 846B is "1", i.e., when the second speed shift flag is UP, a judgement is conducted in Step 853B as to whether the present state falls within the region shown by hatched area (11) in FIG. 23 for allowing the solenoid valve S4 to be de-energized in such a running condition shown in FIG. 23 that the shift position Mp is set for the D range while the main transmission 10 selects the first speed gear. If the answer is YES, i.e., if the present state falls within the region for allowing the solenoid valve S4 to be de-energized, the process proceeds to Step 824B, whereas, if not,the process proceeds to Step 828B.

Although the invention has been described through its preferred forms, it is to be understood that the described embodiments are only illustrative and various changes and modifications may be imparted thereto. For instance, the planetary gear type speed change gears in the main transmission of the described embodiments may be substituted by other types of speed changing mechanism such as mesh-type mechanism which employs a plurality of meshing gear trains, stepless speed change gear, and so forth. The sub transmission can employ automatic speed change gear which operates under the control of a suitable control, e.g., a speed change gear incorporating a plurality of meshing gear trains selectable by a solenoid clutch and a stepless speed change gear operable by a fluid-type actuator, although the sub transmission in the described embodiment employs a planetary gear type speed change gear which provides two speed modes, i.e., the direct-coupling drive mode and reduced-speed drive mode.

It is to be understood also that the described four-wheel drive transfer employing the sub transmission for transmitting power to front wheels and rear wheels is only illustrative and the invention can apply equally well to any type of transmission system which has a main transmission and a sub transmission.

What we claim is:

1. A transmission control device for controlling a subtransmission of a transmission system wherein the transmission system has a main transmission with a plurality of speed changing ratios and the sub transmission is connected to an output shaft of the main transmission, comprising:

an electronic controller means for determining the speed changing ratio in accordance with signals from sensors which sense the shift lever position and other running states of a vehicle; and a means for actuating speed changing mechanisms in the main and sub transmissions in accordance with a signal from the electronic controller so as to control the speed changing ratio of the transmission system, and wherein the electronic controller means comprises: (a) a means for setting controllable ranges of the sub transmission in accordance with an input torque and a vehicle speed for respective driving states of the vehicle, (b) a control signal generating means for generating a speed changing control signal for the sub transmission on condition that the instant running state of the vehicle falls within the controllable ranges and including a means for prohibiting the speed changing operation in the sub transmission when the main transmission is in the transient period, and (c) a control signal generating means for generating a speed changing control signal for the main transmission.

2. A transmission control device according to claim 1, wherein the means for actuating the speed changing mechanisms comprises: (a) a main hydraulic control means having a solenoid valve for selectively engaging and disengaging frictional elements in accordance with the state of supply of electric power to the solenoid valve, thereby changing the speed changing ratio attained by the main transmission, and (b) a sub hydraulic control means having a solenoid valve for selectively engaging and disengaging frictional elements in accordance with the state of supply of electric power of the solenoid valve, thereby changing the speed changing ratio attained by the sub transmission.

3. A transmission control device according to claim 1, wherein the input torque is the input torque of the main transmission.

4. A transmission control device according to claim 1, wherein the input torque is the input torque of the sub transmission.

5. A transmission control device according to claim 1, wherein the sub transmission has a manual change-over valve, and wherein the sub transmission control signal generating means generates the speed changing control signal for the sub transmission in accordance with the position of the manual change-over valve.

6. A transmission control device according to claim 1, wherein the main transmission has a manual change-over valve, and wherein the main transmission control signal generating means generates the speed changing control signal for the main transmission in accordance with the position of the manual change-over valve.

7. A transmission control device according to claim 1, wherein the sub transmission control signal generating means has a means for judging whether the main transmission is in a transient period of speed changing operation.

8. A transmission control device according to claim 7, wherein the means for judging of the transient period is a means for determining a period required for completion of the speed changing operation on the basis of the energize/de-energize switching characteristic of the solenoid valve and the operation characteristics of the elements in the hydraulic circuit, and is further a means for judging whether the determined period has passed from the moment at which the speed changing operation is commenced.

9. A transmission control device according to claim 7, wherein the means for judging of the transient period is a means for determining a period required for completion of the speed changing operation on the basis of the change-over characteristic of the manual change-over valve and the operation characteristics of the elements in the hydraulic circuit, and is further a means for judging whether the determined period has passed from the moment at which the speed changing operation is commenced.

10. A transmission control device according to claim 1, wherein the main transmission control signal generating means has a means for judging whether the sub transmission is in a transient period of speed changing operation and another means for prohibiting the speed changing operation in the main transmission when the sub transmission is in the transient period.

11. A transmission control device according to claim 10, wherein the means for judging of the transient period is a means for determining a period required for completion of the speed changing operation on the basis of the energize/de-energize switching characteristic of the solenoid valve and the operation characteristics of the elements in the hydraulic circuit, and is further a means for judging whether the determined period has passed from the moment at which the speed changing operation is commenced.

12. A transmission control device according to claim 10, wherein the means for judging of the transient period is a means for determining a period required for completion of the speed changing operation on the basis of the change-over characteristic of the manual change-over valve and the operation characteristics of the elements in the hydraulic circuit, and is further a means for judging whether the determined period has passed from the moment at which the speed changing operation is commenced.

* * * * *